ance voltage of staircase waveform during each vertical interval, the step interval of the staircase waveform being equal to the aforementioned period. During each such period, the brightness of each picture element which is shifted into the first row of the storage circuit is compared to the reference voltage, and the columns of light emitting elements are selectively enabled for a duration that is a function of the brightness level of corresponding sampled picture elements. A light emitting element is energized if it is disposed in a row which is conditioned and in a column which is enabled.

United States Patent [19]

Shionoya

[11] 4,194,215
[45] Mar. 18, 1980

[54] METHOD AND APPARATUS FOR DISPLAYING A VIDEO PICTURE ON A MATRIX OF LIGHT EMITTING ELEMENTS

[75] Inventor: Toshio Shionoya, Kawasaki, Japan

[73] Assignee: Sony Corporation, Tokyo, Japan

[21] Appl. No.: 917,018

[22] Filed: Jun. 16, 1978

[30] Foreign Application Priority Data

Jun. 16, 1977 [JP] Japan .................... 52-71545

[51] Int. Cl.² .................... H04N 5/66; H04N 3/12
[52] U.S. Cl. .................... 358/56; 358/59; 358/230; 358/240; 358/241
[58] Field of Search .................... 358/56, 59, 230, 240, 358/241

[56] References Cited

U.S. PATENT DOCUMENTS 3,909,788  9/1975  Kaelin et al. .................... 358/241 X

FOREIGN PATENT DOCUMENTS

| | | |
|---|---|---|
| 1319301 | 6/1973 | United Kingdom . |
| 1334692 | 10/1973 | United Kingdom . |
| 1352889 | 5/1974 | United Kingdom . |
| 1396486 | 6/1975 | United Kingdom . |
| 1400489 | 7/1975 | United Kingdom . |
| 1423368 | 2/1976 | United Kingdom . |
| 1455792 | 11/1976 | United Kingdom . |
| 1488801 | 10/1977 | United Kingdom . |

Primary Examiner—Robert L. Richardson
Attorney, Agent, or Firm—Lewis H. Eslinger; Alvin Sinderbrand

[57] ABSTRACT

A method and apparatus for displaying a video picture on a matrix array of light emitting elements form of m rows and n columns of such elements. The video signal, which is comprised of periodic vertical intervals, each containing successive line intervals of video information, is sampled at a rate of n samples during each line interval. The resultant, n sampled picture elements for each sampled line interval in each vertical interval are stored. During a vertical interval, a given light emitting element, such as the i-th element in the j-th row, corresponding to a sampled picture element in a respective line interval, is energized for a duration greater than a line interval and less than a vertical interval as a function of the brightness of the sampled picture element when that sampled picture element is between and black and peak white levels. In a practical embodiment, a storage circuit stores the n sampled picture elements in each line in an m×n matrix array of storage elements. These stored, sampled picture elements are recirculated on a row-by-row basis periodically, all of the sampled picture elements being fully recirculated in a period which is less than the vertical interval. Each of the m rows of light emitting elements are conditioned sequentially are repetitively, in synchronism with the recirculation of the sampled picture elements in the storage circuit. A reference voltage generator generates a refer- 25 Claims, 23 Drawing Figures

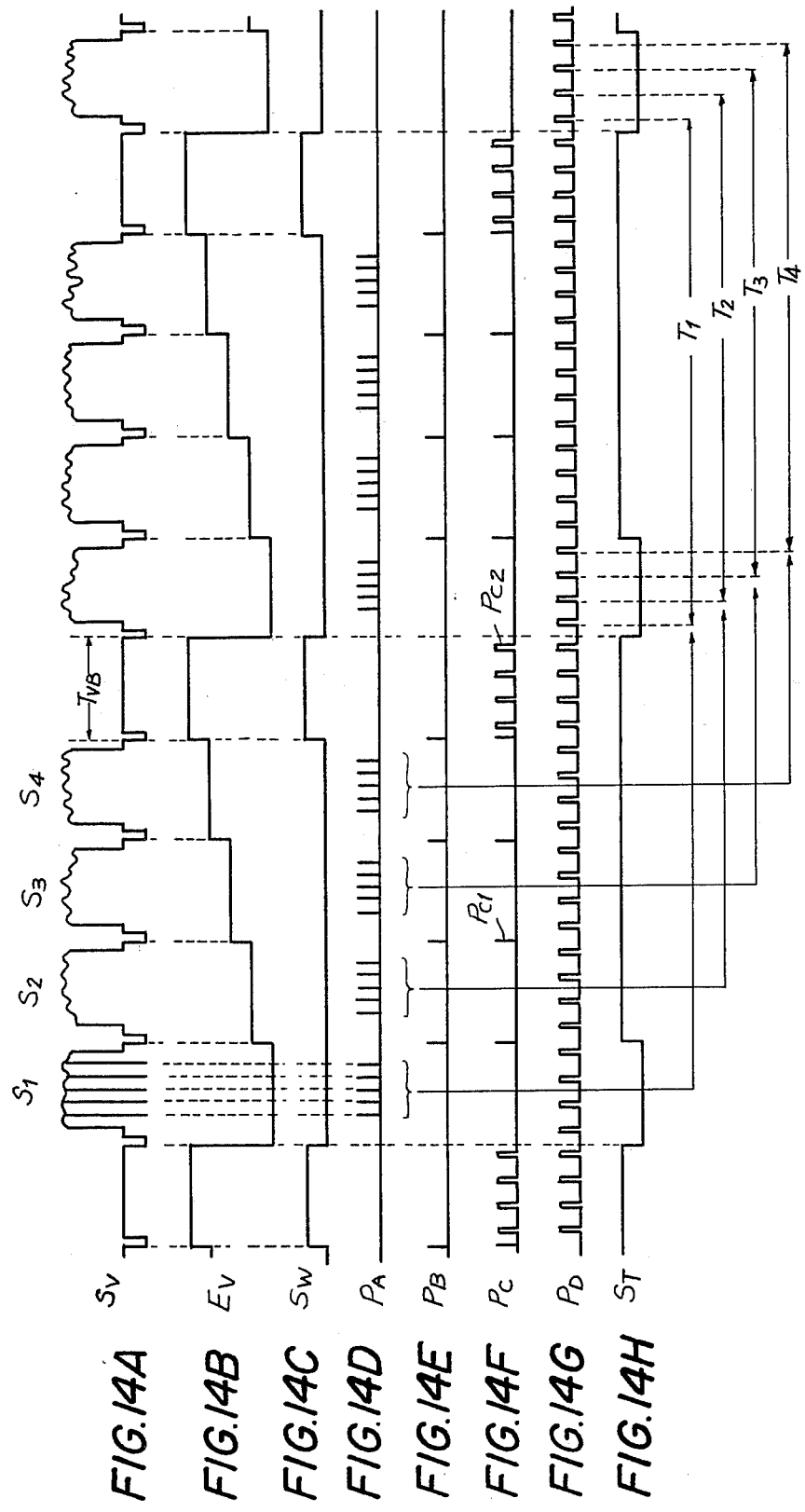

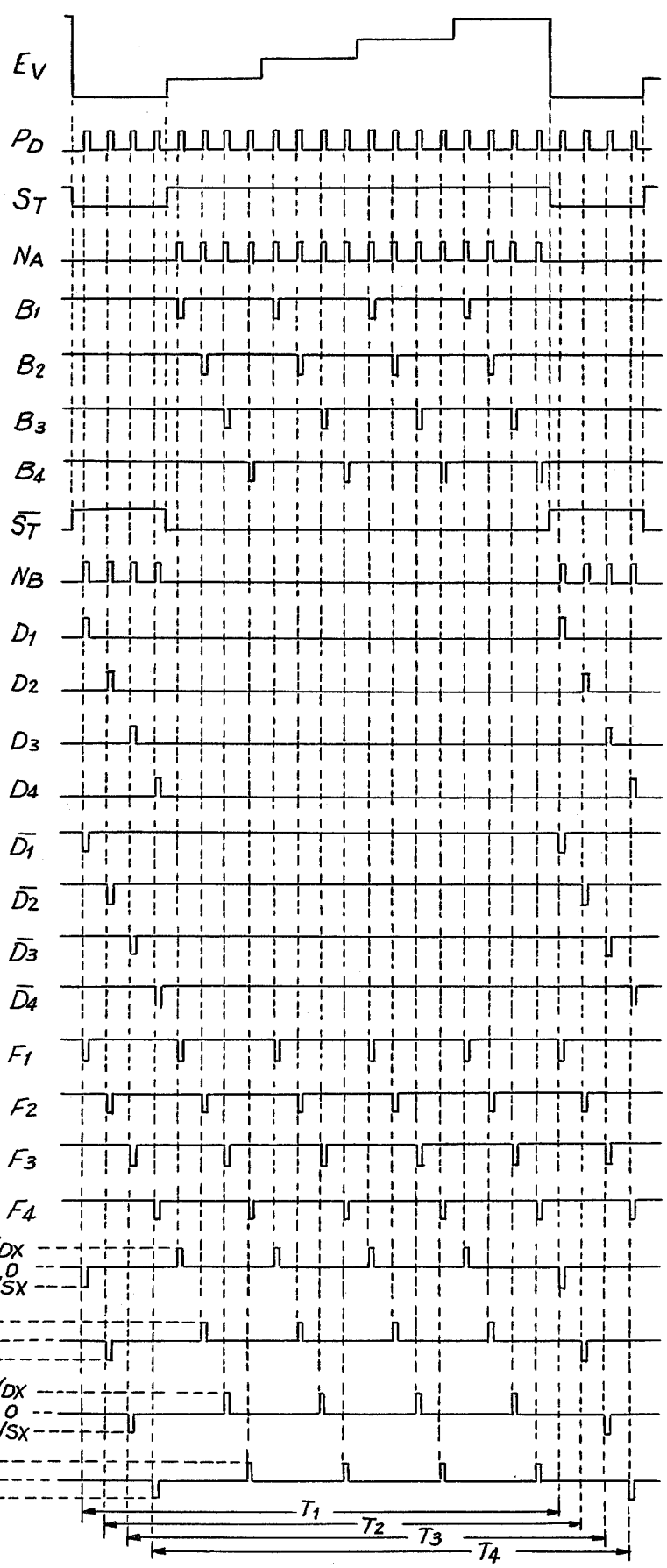

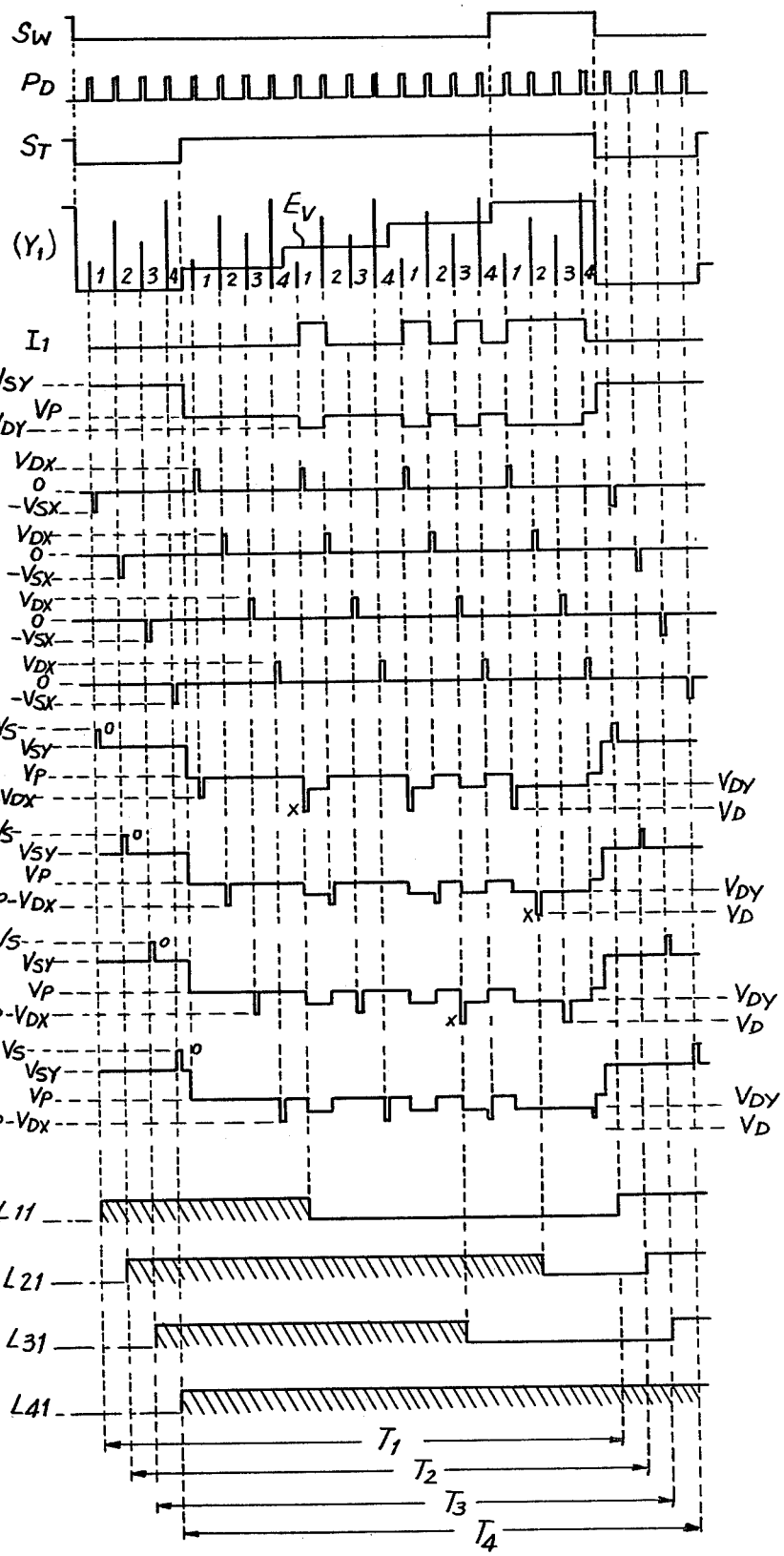

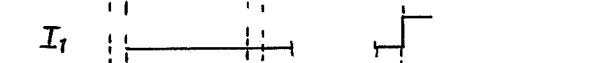
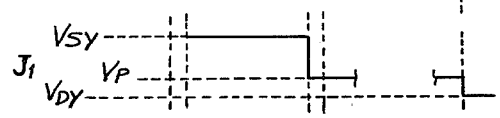
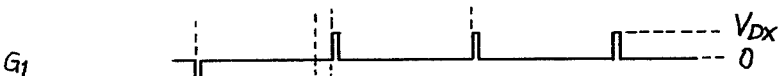
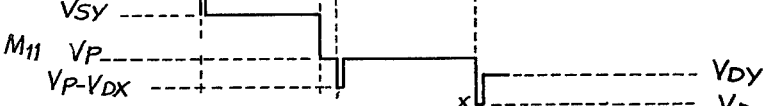
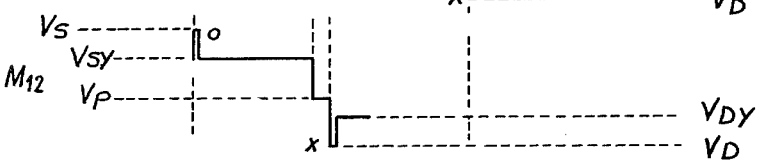
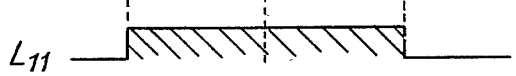
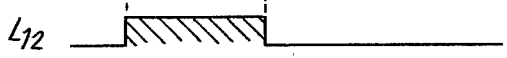

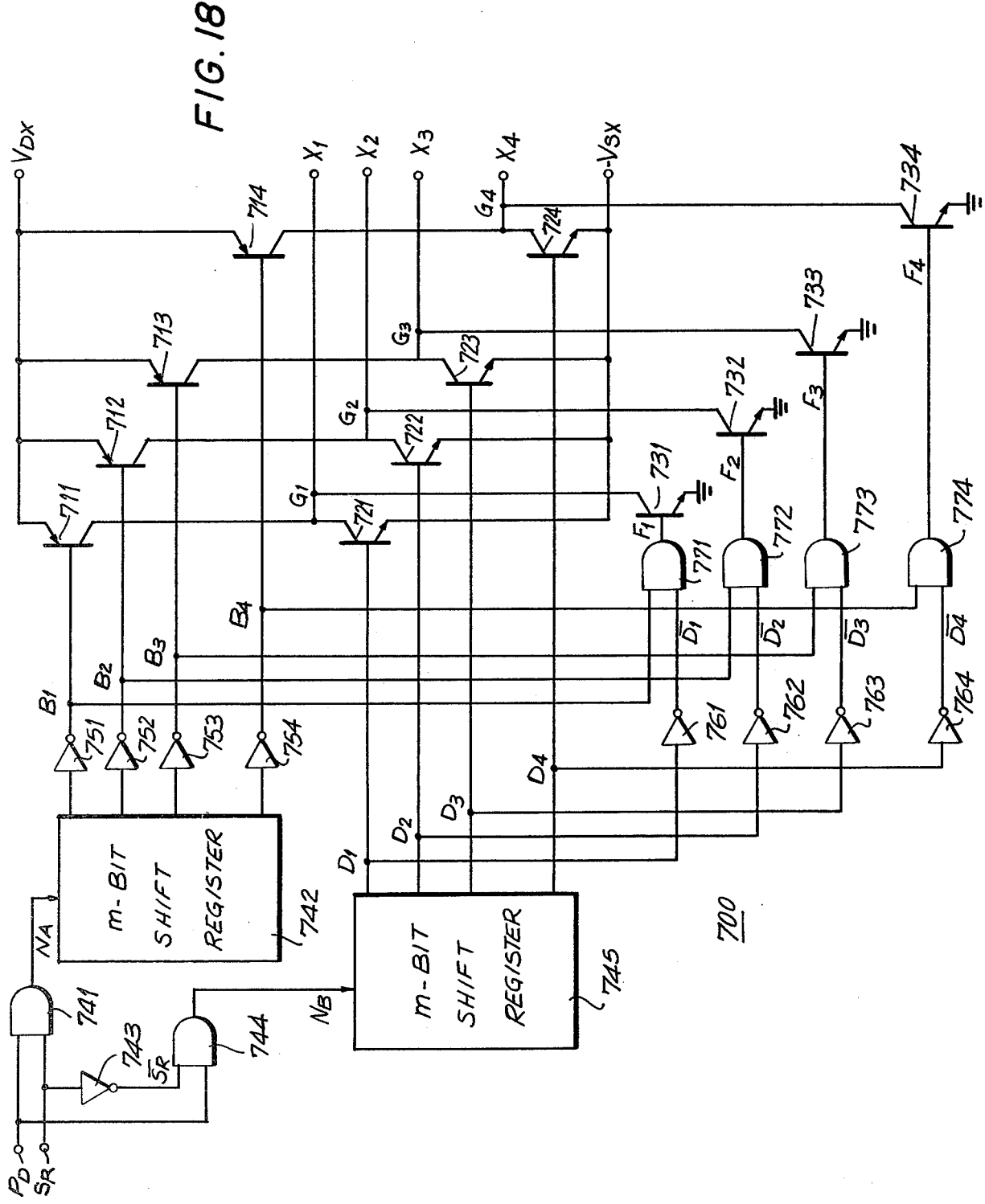

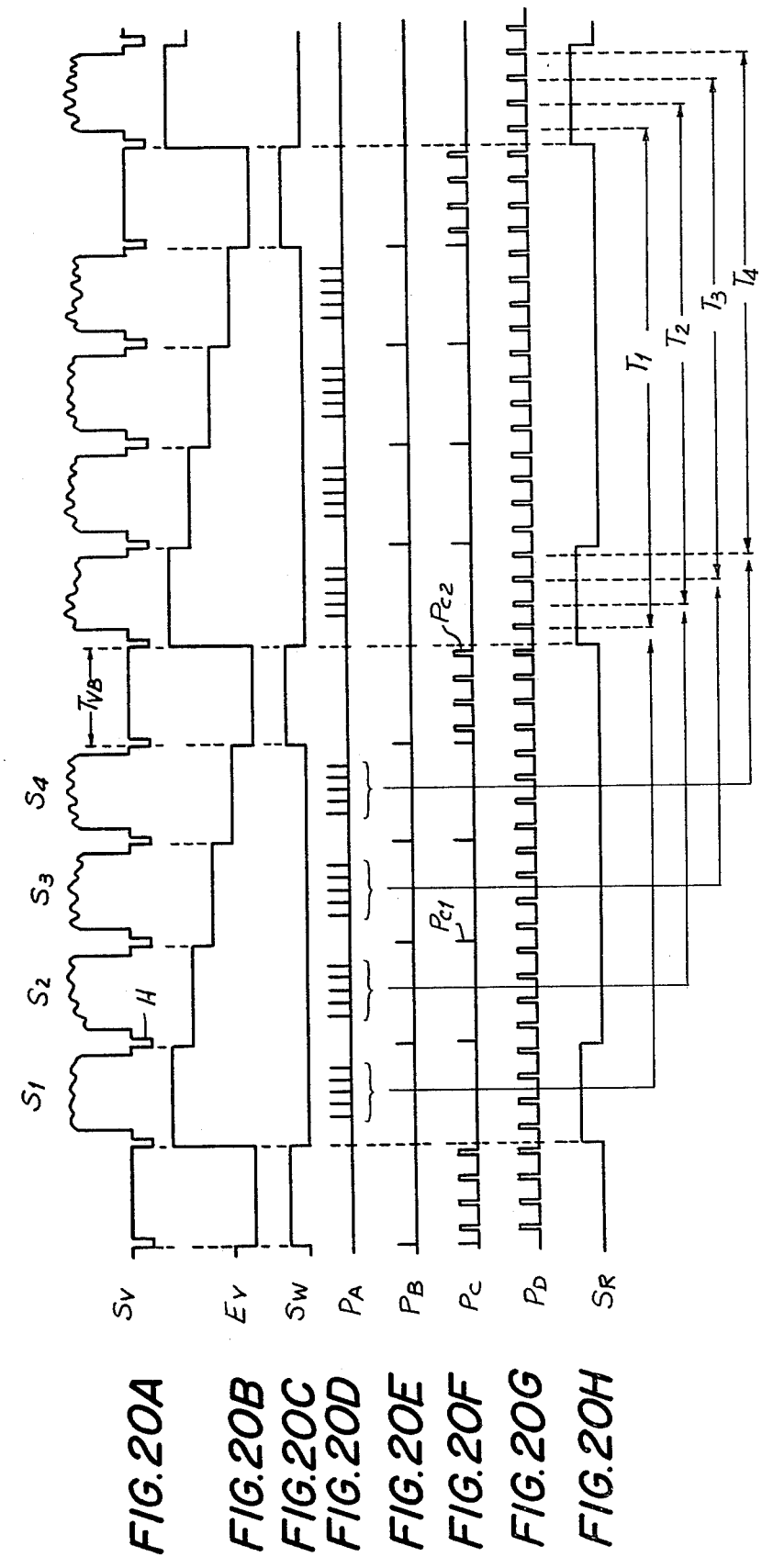

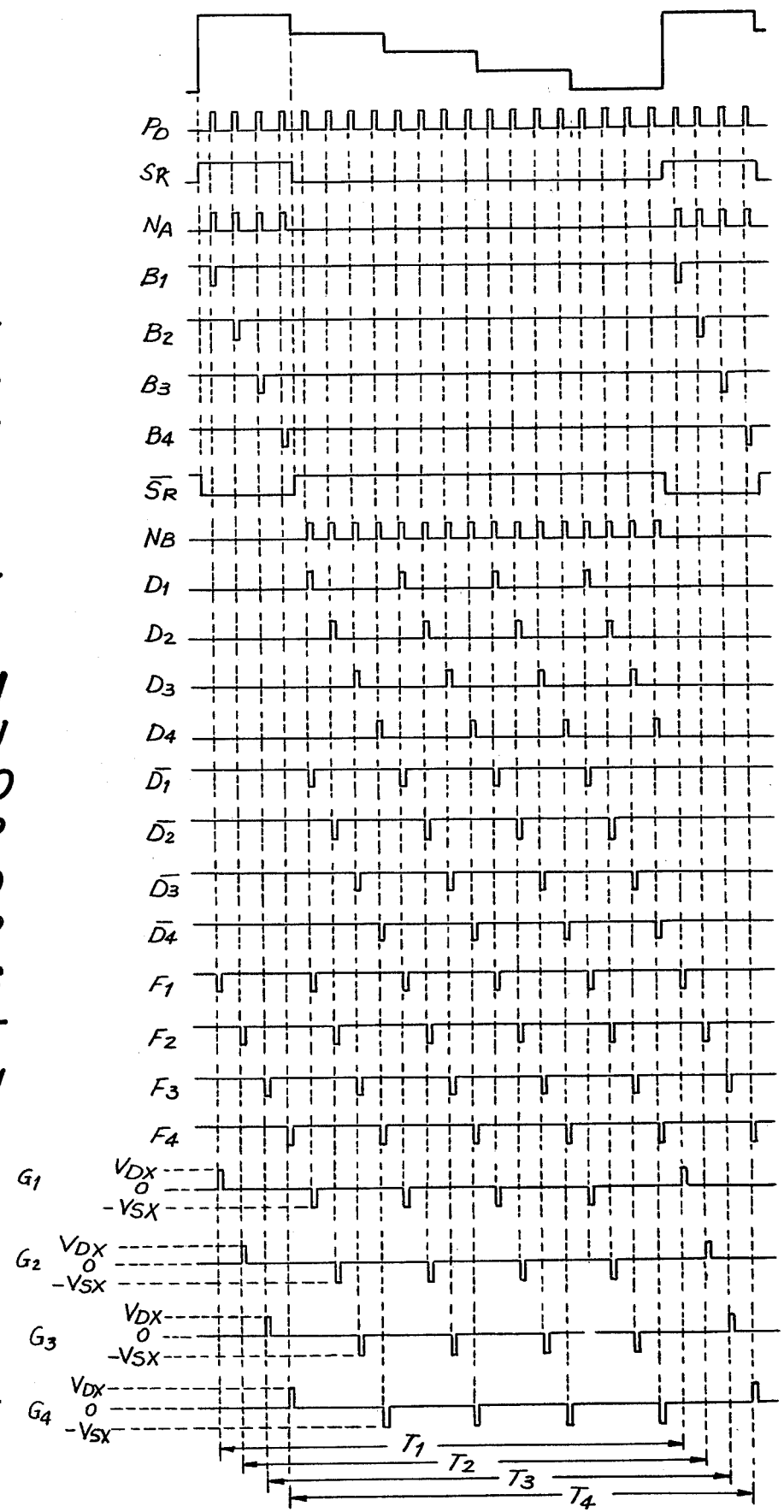

FIG.22A $S_W$
FIG.22B $P_D$
FIG.22C $S_R$
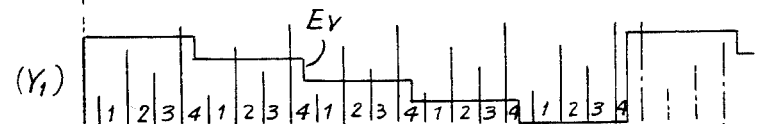
FIG.22D $(Y_1)$
FIG.22E $J_1$ $I_1$
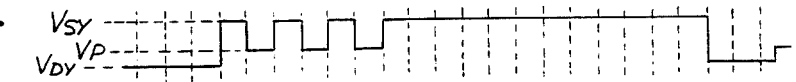
FIG.22F $V_{SY}$ $V_P$ $V_{DY}$
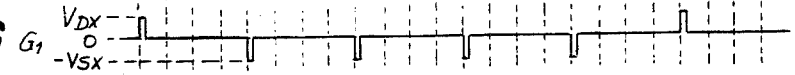
FIG.22G $G_1$
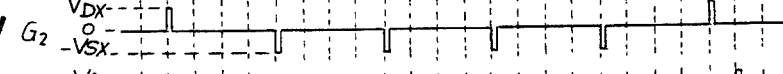
FIG.22H $G_2$
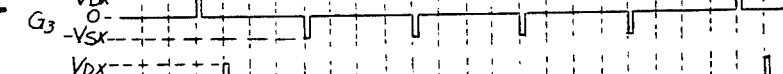
FIG.22I $G_3$
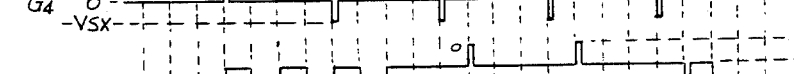
FIG.22J $G_4$
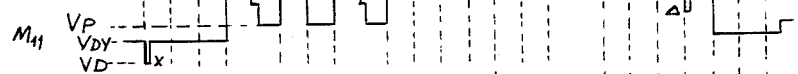
FIG.22K $M_{41}$
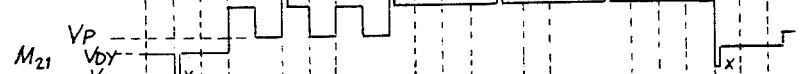
FIG.22L $M_{21}$
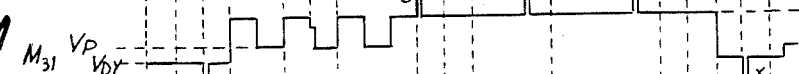
FIG.22M $M_{31}$
FIG.22N $M_{41}$
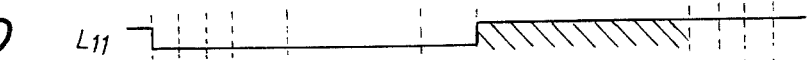
FIG.22-O $L_{11}$
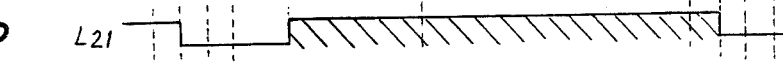
FIG.22P $L_{21}$
FIG.22Q $L_{31}$
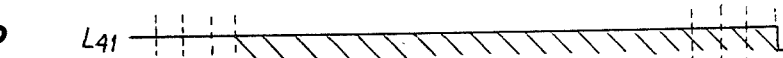
FIG.22R $L_{41}$
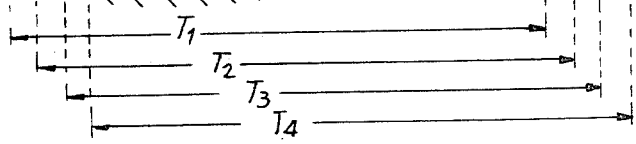

METHOD AND APPARATUS FOR DISPLAYING A VIDEO PICTURE ON A MATRIX OF LIGHT EMITTING ELEMENTS

BACKGROUND OF THE INVENTION

This invention relates to a method and apparatus for displaying a video picture and, more particularly, to such a method and apparatus wherein a video picture is displayed on an m×n matrix array of light emitting elements with improved brightness control.

A conventional video picture is displayed on the screen of a cathode ray tube (CRT) by scanning a raster across the face of the CRT. Video picture information is transmitted in the form of periodic vertical intervals, such as field intervals, each vertical interval being constituted by a number of horizontal line intervals of video information. Thus, the displayed raster likewise consists of rows of video information displayed during each vertical interval.

It has been proposed that the typical CRT be replaced by an XY matrix array of light emitting elements for the purpose of displaying a video picture. It is thought that this would simplify the display apparatus, such as a television receiver, by eliminating the usual electron beam, horizontal and vertical beam scanning yokes, vacuum envelope and high voltage devices and generators, all of which are presently used in a CRT or in a CRT driving circuit. The XY array could be formed in a relatively simple panel, constructed as a grid arrangement, and being provided merely with row and column electrodes, respectively. Such a simplification over a conventional CRT is quite advantageous.

One significant problem in video display systems using a flat panel X-Y matrix arrangement heretofore known is in obtaining sufficient brightness in the displayed video picture and, moreover, a satisfactory number of different, perceptible brightness levels. Generally, two different techniques have been used in energizing each light emitting element so as to obtain a desired brightness level. One such technique is known as the pulse amplitude modulation (PAM) technique, wherein a particular light emitting element in a row is energized once during each vertical interval for a pre-established duration. The brightness of the light emitted by that element is a function of the amplitude of the pulse which is supplied thereto, this amplitude being related to the brightness level of the sampled picture element which corresponds to that light emitting element. That is, if there are, for example, m line intervals in each vertical interval, such as m line intervals during each field interval, and if each line interval is sampled n times, then a given light emitting element, such as the light emitting element defined by the i-th row and the j-th column is energized as a function of the j-th sample of the i-th line interval in the video signal. However, since a given light emitting element is energized only once during each vertical interval, it is necessary that a very high voltage be supplied to that light emitting element in order to attain a corresponding high brightness level therefrom. Furthermore, because this PAM technique achieves a brightness level corresponding to the sampled amplitude of a picture element, only a relatively small number of different brightness steps can be provided. This, in turn, limits the overall resolution of the displayed video picture.

Another technique is known as the pulse width modulation (PWM) technique wherein a given light emitting element is energized once during each vertical interval for a duration corresponding to the sampled amplitude of an associated picture element. However, since each row of light emitting elements is conditioned sequentially, the maximum energization duration of any such element is no greater than a line interval. Thus, the maximum number of brightness steps which can be discriminated is limited because of this constraint. Also, since there is an inherent time delay in energizing and de-energizing a light emitting element, the number of different brightness steps which can be provided is further limited.

It has been proposed, in U.S. Pat. No. 4,021,607, issued May 3, 1977, and assigned to the same assignee as the present invention, to combine the PAM and PWM techniques. In this system, a quantized sample picture element amplitude is represented by a pulse of predetermined amplitude and duration. Accordingly, a relatively large number of brightness levels can be displayed. However, here too, since the rows of light emitting elements are energized sequentially on a row-by-row basis, the j-th element in the i-th row can be energized only once during each vertical interval, and the duration and amplitude of the current which flows through the light emitting element, and which determines the brightness of the light emitted thereby, still is limited.

OBJECTS OF THE INVENTION

Therefore, it is an object of the present invention to provide an improved method and apparatus for displaying a video picture on a matrix array of light emitting elements wherein a far greater number of distinguishable brightness levels are provided than have been heretofore achieved.

A further object of this invention is to provide an improved method and apparatus for displaying a video picture on a flat panel of light emitting elements arranged in an X-Y matrix, wherein a given light emitting element is energized for a duration which is a function of the amplitude of a corresponding sampled picture element, which duration is greater than a line interval, and less than a vertical interval.

Another object of this invention is to provide an improved method and apparatus for displaying a video picture on a panel of light emitting elements arranged in a X-Y matrix in which each light emitting element is energized with high efficiency, and wherein relatively low current levels are used to achieve a high lifetime of the panel.

An additional object of this invention is to provide a method and apparatus for displaying a video picture on a matrix array of light emitting elements formed of m rows and n columns, wherein each of the m rows is conditioned sequentially a plural number of times during each vertical interval to control the energization of the respective light emitting elements in such rows during such conditioning period.

Various other objects, advantages and features of the present invention will become readily apparent from the ensuing detailed description, and the novel features will be particularly pointed out in the appended claims.

SUMMARY OF THE INVENTION

In accordance with the present invention, a method and apparatus are provided for displaying a video picture on a matrix array of light emitting elements formed of m rows and n columns of such elements. A video signal, comprised of periodic vertical intervals, such as field or frame intervals, each containing successive line intervals of video information, is sampled n times during each line interval, and each sampled picture element is stored. During a vertical interval, a light emitting element corresponding to a sampled picture element in a respective line interval, such as the j-th element in the i-th row, is energized for a duration greater than a line interval and less than a vertical interval as a function of the brightness of the sampled picture element. In a preferred embodiment, the sampled picture elements are stored in an m×n matrix array of storage elements, all of the stored picture elements in a given row being recirculated on a row-by-row basis repeatedly during a vertical interval, the period for recirculating all of the picture elements being less than a vertical interval. A reference voltage of staircase waveform is generated during each vertical interval, the step interval of the staircase waveform being equal to the aforementioned period. A light emitting element is energized for as long as its corresponding sampled picture element exceeds the reference voltage.

In accordance with one embodiment of this invention, all of the light emitting elements in each line are energized, sequentially by line, at the beginning portion of a vertical interval, and each energized light emitting element is extinguished at a later time during the vertical interval depending upon the brightness of the corresponding sampled picture element. In accordance with another embodiment of this invention, a light emitting element is energized at a time during the vertical interval depending upon the brightness of the corresponding sampled picture element, and all of the energized light emitting elements are extinguished, sequentially by line, following the completion of the vertical interval.

BRIEF DESCRIPTION OF THE DRAWINGS

The following detailed description, given by way of example, will best be understood in conjunction with the accompanying drawings in which:

FIGS. 14A–14H, 15A–15Z, 16A–16R and 17A–17N are waveform diagrams which are useful in explaining the operation of the present invention;

FIG. 18 is a logic diagram of another embodiment of row-driving circuitry for the X-Y array which can be used with the present invention;

FIGS. 20A–20H, 21A–21Z and 22A–22R are waveform diagrams which are useful in understanding the operation of the embodiment shown in FIGS. 18 and 19.

DETAILED DESCRIPTION OF SOME PREFERRED EMBODIMENTS

Figure 1:
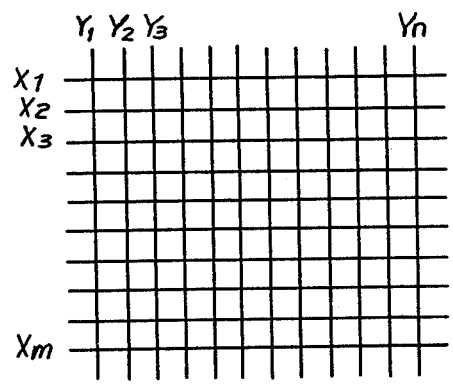
FIG. 1 is a schematic illustration of an X-Y matrix arrangement of light emitting elements which can be used with the present invention.

FIG. 1 is a schematic representation of a matrix array of light emitting elements which can be used with the present invention. This array is formed of m rows $X_1$, $X_2$, ... $X_m$, each row containing n columns, $Y_1$, $Y_2$, ... $Y_n$. A light emitting element is provided at the intersection of each row X and column Y. As an example, each light emitting element may comprise a gas discharge device having an electrode, such as a column electrode, connected in a column line and another electrode, such as a row electrode, connected in a row line. Thus, element $M_{11}$ is provided at the intersection of row $X_1$ and column $Y_1$, element $M_{12}$ is provided at the intersection of row $X_1$ and column $Y_2$, and so on until element $M_{1n}$ is provided at the intersection of row $X_1$ and column $Y_n$. Similarly, element $M_{21}$ is provided at the intersection of row $X_2$ and column $Y_1$, element $M_{22}$ is provided at the intersection of row $X_2$ and column $Y_2$, and so on. Therefore, a generalized light emitting element can be identified as $M_{ij}$, this light emitting element being provided at the intersection of row $X_i$ and column $Y_j$. When an energizing voltage is provided across the column and row electrodes of a gas discharge device, the device discharges to emit light. The device remains in this condition until an extinguishing voltage is provided across its electrodes. Of course, other examples of light emitting elements can be provided, such as light emitting diodes (LED's), liquid crystal devices, electroluminiscent elements, and the like.

Figure 2:
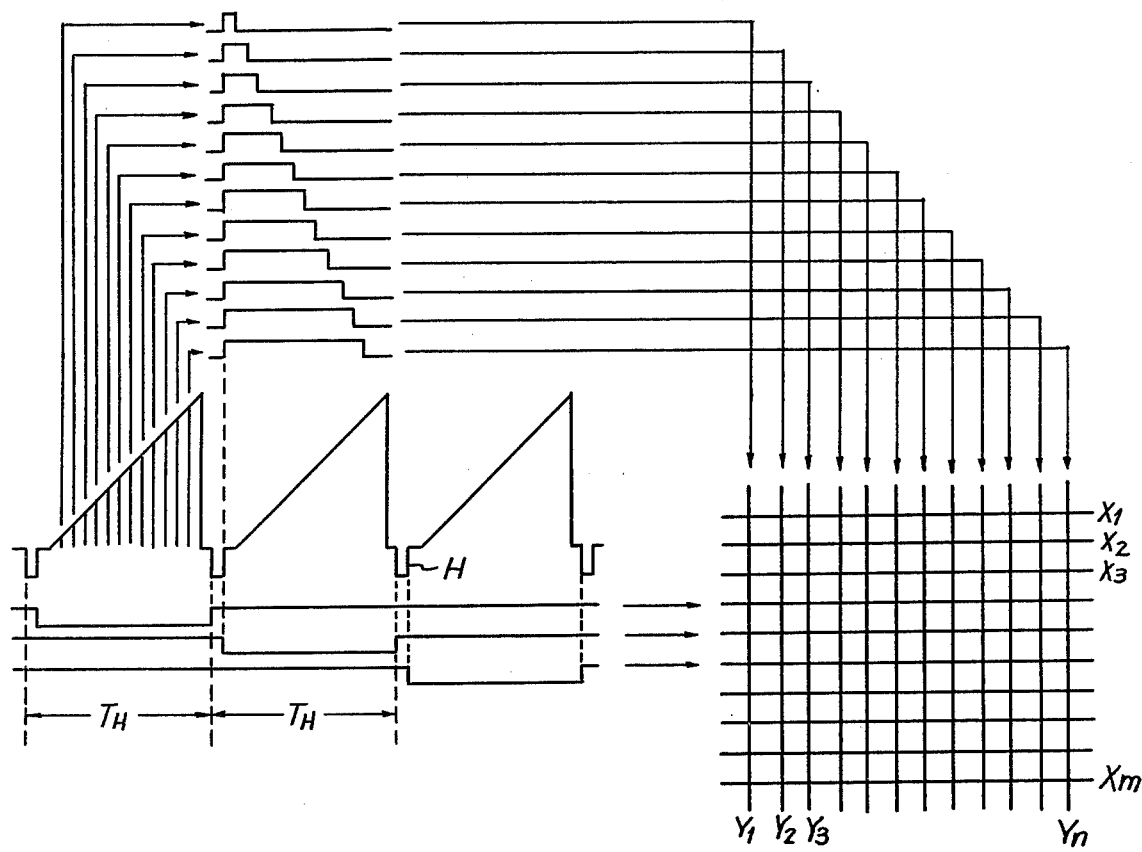
FIG. 2 is a waveform diagram representing a typical PWM technique known to the prior art for energizing a X-Y matrix array.

Before describing the present invention in detail, reference is made to FIG. 2 which represents one technique used heretofore in driving the X-Y array shown in FIG. 1 for displaying a video picture. In a typical, known technique, each line interval of an incoming video signal is sampled, for example, n times, to obtain n sampled picture elements, each element corresponding to the brightness level of the video information included in that line interval. As shown in FIG. 2, each line interval, whose duration is represented as $T_H$, is provided with video signal information, here shown as a triangular, increasing waveform. The video information is sampled at successive sampling times, and each sampled picture element amplitude is represented as a pulse of corresponding duration. Since there are n samples during each line interval $T_H$, each pulse, which represents the brightness of a sampled picture element, is supplied in sequence to a respective one of column lines $Y_1 \ldots Y_n$. Thus, during one line interval, pulses of respective durations are supplied to respective ones of column lines $Y_1 \ldots Y_n$, during the next line interval, pulses of respective durations are supplied to these column lines, and so on. In addition, row lines $X_1 \ldots X_m$ are energized, sequentially, as each incoming line interval is received. For example, when line interval No. 1 is received, row line $X_1$ is energized for a line duration $T_H$. Then, when the next following line interval is received, row line $X_2$ is energized for a duration $T_H$. This process continues until row line $X_m$ is energized, and this occurs at the end of a vertical interval. For the purpose of the present discussion, a "vertical interval" is equal either to a field interval or to a frame interval. Thus, row lines $X_1 \ldots X_m$ are energized, sequentially, during each field or frame of video signals. It is appreciated that, when line interval No. 1 is received, and row line $X_1$ is energized, only the light emitting elements which are disposed in row $X_1$ are selectively discharged in accordance with the duration of the respective pulses which are supplied thereto, these pulses representing the brightness levels of the corresponding sampled picture elements. Then, when line interval No. 2 is received, only the light emitting elements disposed in row $X_2$ are selectively energized. Therefore, the light emitting elements are discharged, selectively, on a row-by-row basis, once during each interval. That is, column lines $Y_1 \ldots Y_n$ are energized at the line repetition rate $T_H$, while rows $X_1 \ldots X_m$ are energized at the vertical repetition rate.

In the technique depicted in FIG. 2, the maximum duration at which a light emitting element can be energized is equal to one horizontal line interval $T_H$. For example, if the video signal is as represented by the triangular waveform shown in FIG. 2, then the maximum amplitude, or brightness, occurs at the n-th sampled picture element. Thus, column line $Y_n$ is energized for substantially the entire horizontal line interval, as shown. It may be appreciated that this places severe constraints on the brightness of the light emitted by a typical light emitting element. That is, the emitted light can be no brighter than the light which is emitted in response to a pulse whose duration is slightly less than 63.5 microseconds, i.e., the duration of a horizontal line interval. Consequently, it would appear to be necessary that, in order to achieve a desirably high maximum brightness level, a sufficiently high current must flow through the light emitting element for the duration of the discharge pulse which is applied thereto. If the light emitting element is assumed to be a gas discharge device, which is a typical element, the relationship between the brightness of the light emitted thereby and the discharge current which flows therethrough is graphically depicted in FIG. 3. It is seen that brightness increases relatively rapidly for low current levels, but at a much slower rate for higher current levels. After a current level of about 0.5 mA, a relatively large amount of current increase is needed in order to produce even a small amount of increase in brightness. Thus, at higher current levels, such as those greater than 0.5 mA, the light emission efficiency is significantly reduced, as shown in FIG. 4.

In addition to being relatively inefficient, video display systems having an X-Y array of light emitting elements heretofore have been limited to a relatively small number of discrete brightness steps, or levels, which can be displayed. Since the maximum brightness level is limited to a pulse duration which is less than one horizontal line interval $T_H$, the number of brightness levels which can be displayed is determined by the quotient of this duration $T_H$ divided by the minimum discharge pulse duration which attains a change in the brightness level. This minimum duration also is a function of the inherent time delay before a light emitting element is discharged in response to the discharge pulse supplied thereto, and the persistance of the light emitting element following the termination of the discharge pulse. Hence, if the brightness is divided into many discrete levels, each level being represented by a pulse of corresponding duration, one brightness level would not be distinguishable from an adjacent level. This, of course, is due to the fact that the maximum brightness level is determined by a pulse whose duration cannot exceed, and actually is less than, the horizontal line interval $T_H$.

Figure 3:
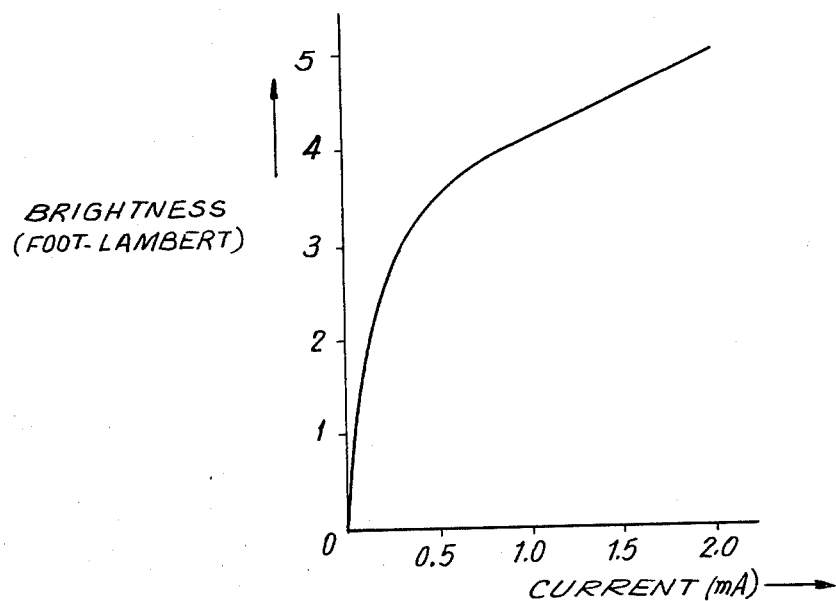
FIG. 3 is a graphical representation of the brightness-current relationship of a typical light emitting element which can be used in the X-Y matrix array.
Figure 4:
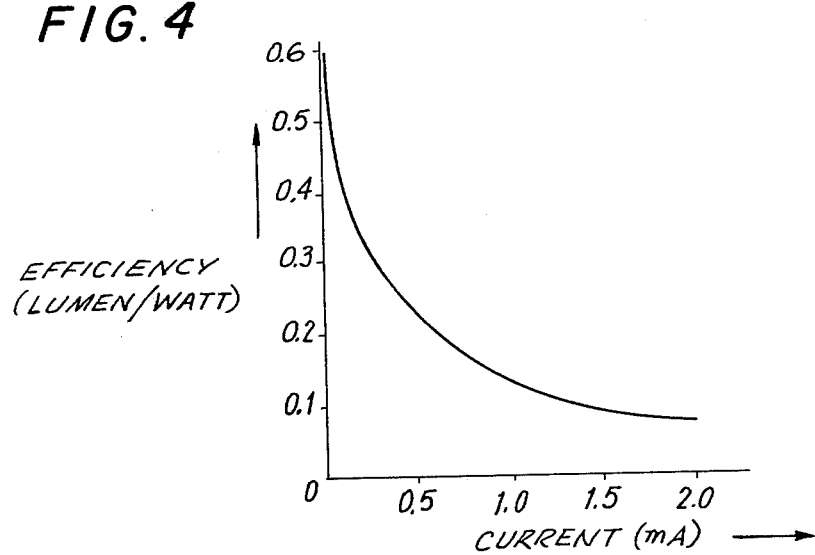
FIG. 4 is a graphical representation of the efficiency of one type of light emitting element which can be used with the present invention.

In addition to the problem of driving the light emitting element relatively inefficiently by attempting to increase the brightness of the light emitted thereby by increasing the amplitude of the discharge current supplied thereto, as shown graphically in FIG. 3, and as also shown in FIG. 4, the use of a relatively high discharge current tends to damage the light emitting element. Also, the use of high discharge currents substantially shortens the useful lifetime of the element.

The present invention, now to be described, avoids all of these difficulties of prior art video display systems using X-Y arrangements of light emitting elements. In accordance with one principle of operation, represented by the waveforms shown in FIG. 5, a given light emitting element, such as element $M_{ij}$, is energized at the beginning of a field interval and remains energized for a duration that is determined by the brightness level of the sampled picture element corresponding to that light emitting element. An important feature of this invention is that the discharge duration of the light emitting element is no less than a horizontal line interval and, moreover, can extend for an entire field interval. Consequently, a much larger number of discrete brightness levels can be attained, particularly since the number of such levels now is determined as a function of the duration of the field interval rather than the duration of a horizontal line interval. In a practical embodiment, if two hundred lines of video information are displayed during each field interval, and if a minimum discharge duration is assumed to be two line intervals, then one hundred ($200 \div 2$) discrete brightness levels easily can be accommodated. If the minimum discharge duration is assumed to be equal to one horizontal line interval, then two hundred discrete brightness levels can be accommodated.

Figure 5:
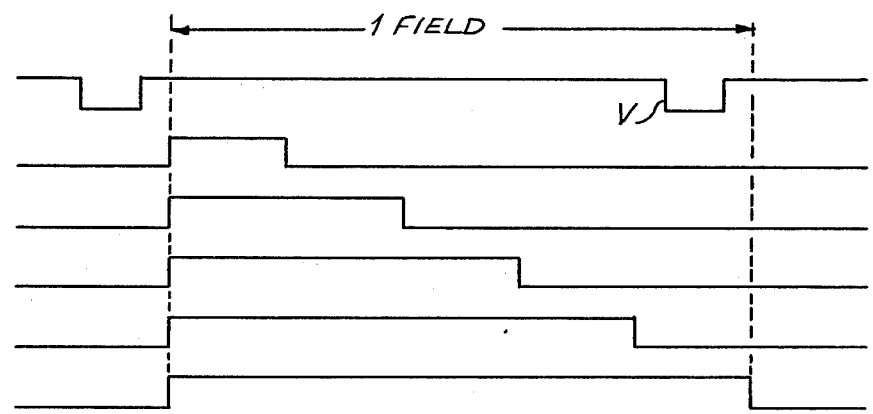
FIGS. 5 and 6 are elementary waveform diagrams which are useful in explaining the operation of the present invention.
Figure 6:
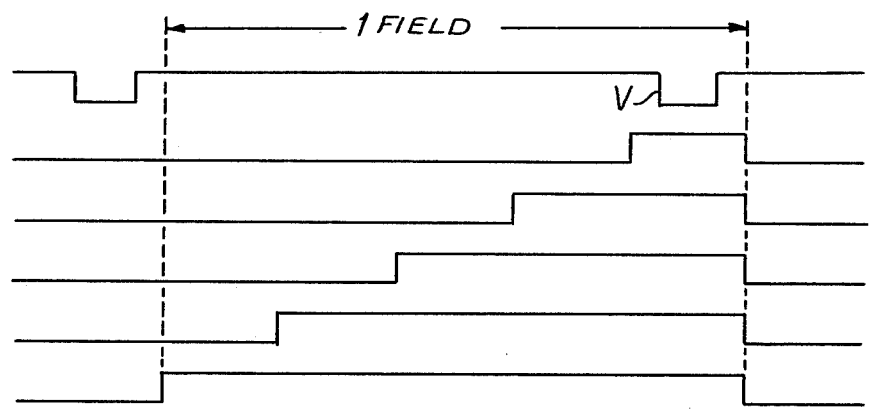

FIG. 5 represents one principle of operation wherein all of the light emitting elements in the X-Y matrix array are discharged during a beginning portion of a field interval, and selected elements are extinguished at different times during the field interval in accordance with the brightness level of the corresponding sampled picture element. In accordance with another principle of operation of the present invention, selected light emitting elements are discharged at various times during a field interval, depending upon the brightness level of the corresponding sampled picture elements, and all light emitting elements are extinguished following the completion of the field interval. Nevertheless, and as shown in FIGS. 5 and 6, the discharge duration of a light emitting element is determined by the brightness level of its corresponding sampled picture element, and this duration is greater than a horizontal line interval and, generally, less than a field interval. Since the minimum discharge duration of a light emitting element in accordance with the present invention is equal to or greater than the maximum discharge duration of prior art techniques, such as shown in FIG. 2, it is recognized that substantially smaller current levels can be used to achieve the requisite brightness levels by this invention. Therefore, each light emitting element is driven in an efficient manner by using relatively low current levels, and the lifetime of the light emitting elements is significantly increased.

While FIGS. 5 and 6 depict that each light emitting element is discharged for a selected portion (or all) of a field interval, it is contemplated that the light emitting elements can be selectively discharged for a portion (or all) of a frame interval. For the purpose of the following discussion, the expression "vertical interval" will be used to mean either a field interval or a frame interval.

Figure 7:
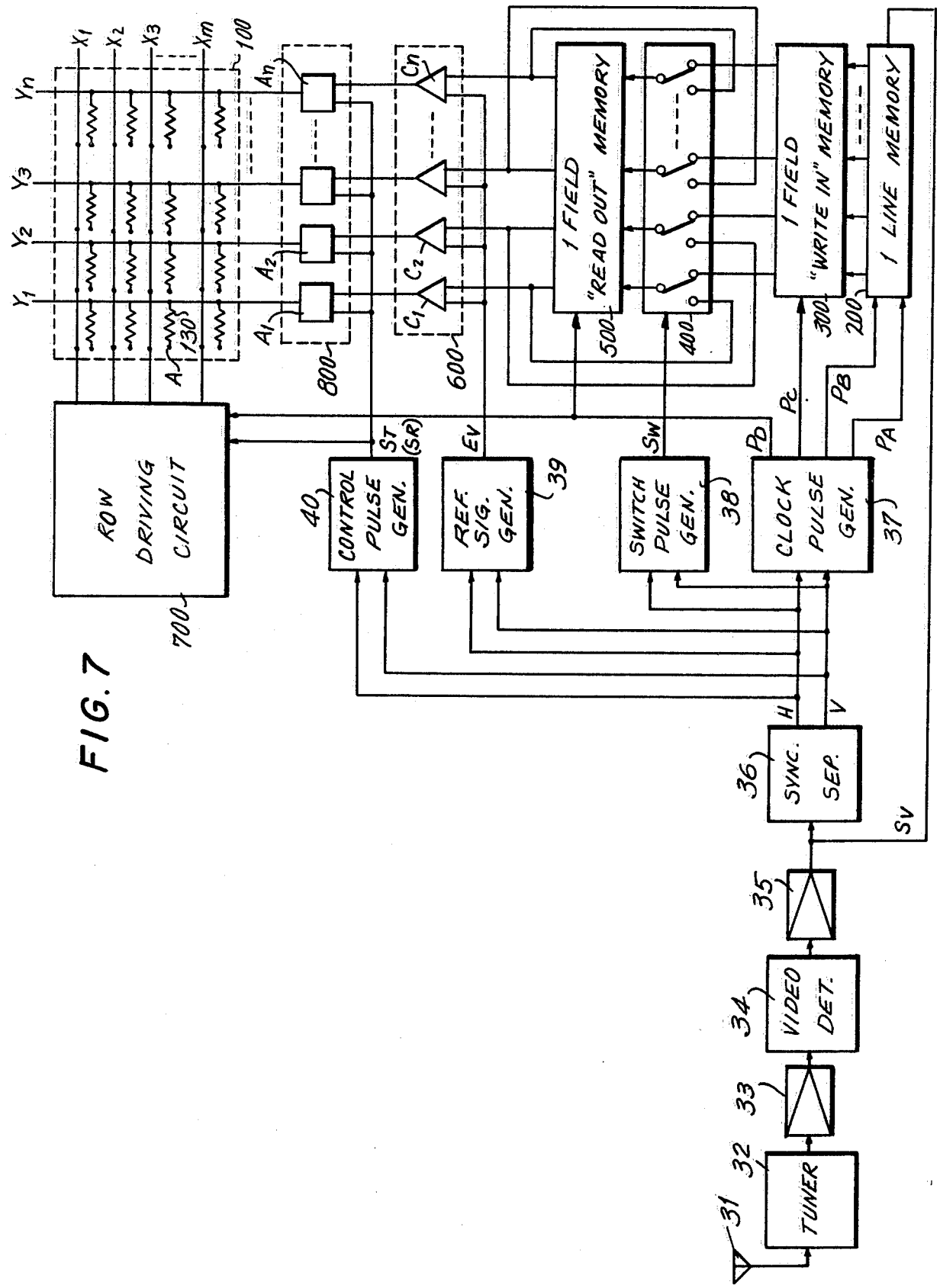
FIG. 7 is a block diagram of one embodiment of this invention.

Turning now to FIG. 7, there is illustrated a block diagram of a video display system in accordance with the teachings of the present invention. The display system includes a signal receiving section comprised of a tuner 32, an IF amplifier 33, a video detector 34, a video amplifier 35 and a synchronizing signal separator 36. These elements are conventional and are connected in cascade to an antenna 31 which is provided for receiving a video signal. Thus, a video signal $S_V$ is produced at the output of video amplifier 35, and horizontal synchronizing signals H and vertical synchronizing signals V are produced at respective outputs of synchronizing signal separator 36.

The video display system includes a flat panel 100 formed of an X-Y matrix array of light emitting elements. This flat panel includes m rows of conductors $X_1 \ldots X_m$, and n columns of conductors $Y_1 \ldots Y_n$. At the intersection of each row and column there is provided a light emitting element, such as a gas discharge device, having a row electrode connected to the row conductor and a column electrode connected to the column conductor. More particularly, the light emitting element, designated A, has its column electrode connected by a resistor 130 to a respective column conductor. Further description of the construction of panel 100 and each light emitting element included therein is set out hereinbelow with respect to FIGS. 8, 9 and 13.

Figure 11:
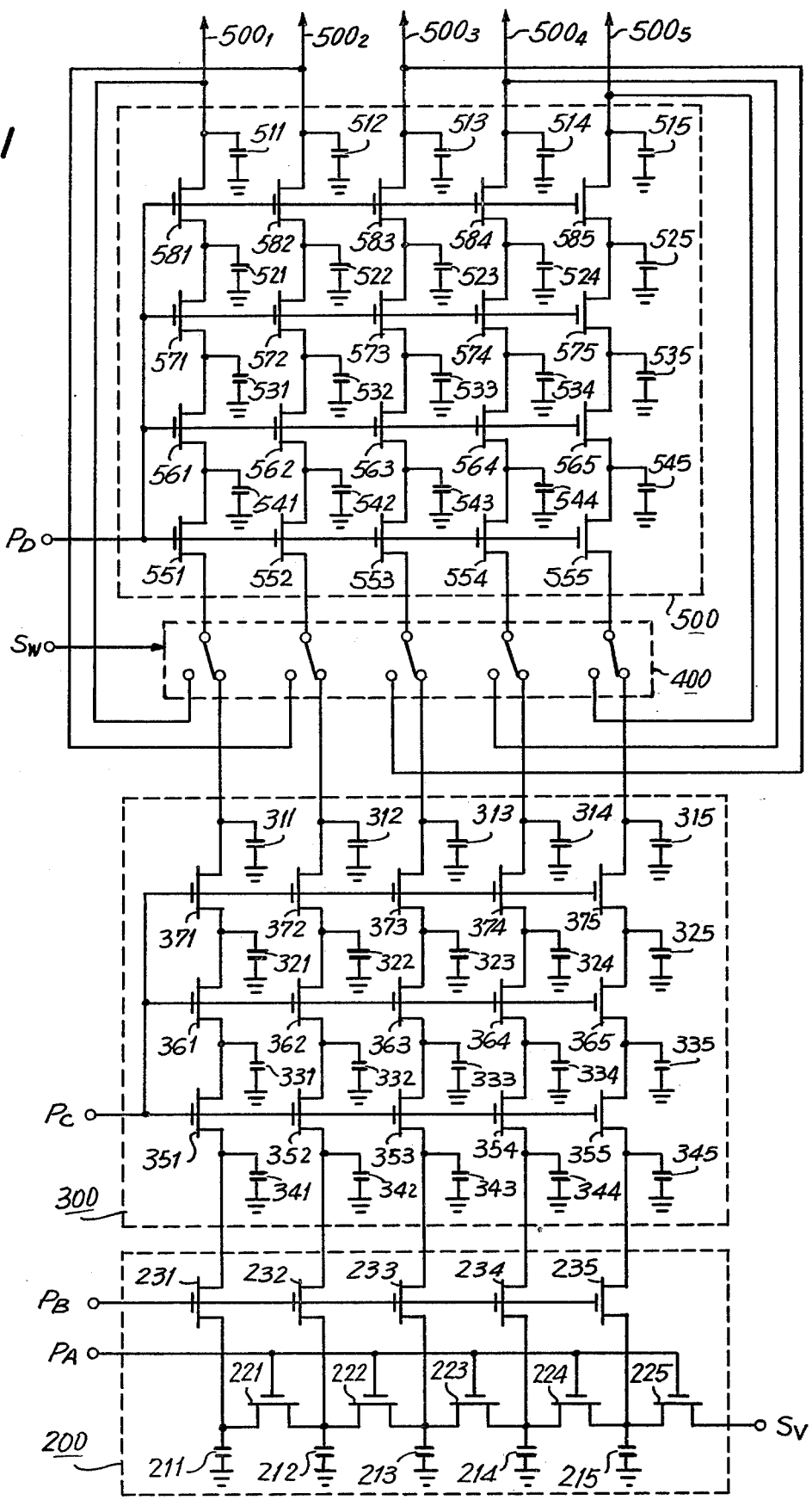
FIG. 11 is a simplified schematic diagram of an embodiment of the sampling and storage circuitry used with the present invention.

The video display system further includes a sample-and-hold circuit 200, a write-in memory circuit 300, a switching circuit 400, a read-out memory circuit 500, comparators 600 and a column driving circuit 800. Sample-and-hold circuit 200, described in greater detail with respect to FIG. 11, is adapted to sample each line of video signals included in the incoming video signal $S_V$. Accordingly, sample-and-hold circuit 200 includes a signal input terminal coupled to video amplifier 35 for receiving video signal $S_V$ and a sampling pulse input terminal connected to receive periodic sampling pulses $P_A$. As will be described, n samples of a line of video signals are obtained at n discrete sampling times, such that sampling pulses $P_A$ are produced at the rate of n sampling pulses during each line interval. The sample-and-hold circuit additionally includes n storage elements, such as capacitors, for storing each discrete sample of the incoming line of video signals. Each of the n samples is designated herein as a sampled picture element.

Sampling pulses $P_A$ are adapted to be produced by a clock pulse generator 37 which is coupled to synchronizing separator circuit 36 and receives the separated horizontal synchronizing pulses H and the separated vertical synchronizing pulses V. The clock pulse generator may be constructed of conventional oscillating circuits, divider circuits and gating circuits so as to produce n sampling pulses $P_A$ during each line interval. In addition, the clock pulse generator generates transfer pulses $P_B$ at the rate of one transfer pulse following each line interval, write/transfer pulses $P_C$ at the rate of one write pulse at the end of each line interval and m transfer pulses during each vertical blanking interval, and recirculating, or shift, pulses $P_D$ at the rate of m recirculating pulses during a predetermined period, to be described. Transfer pulses $P_B$ are coupled to sample-and-hold circuit 200 and are adapted to transfer a line of sampled picture elements from the storage devices in the sample-and-hold circuit into write-in memory circuit 300. These sampled picture elements are transferred sequentially on a line-by-line basis, with a full line of sampled picture elements being transferred in parallel.

Write-in memory circuit 300 is adapted to store an entire field, or vertical interval, of sampled picture elements. As will be described in greater detail with respect to FIG. 11, write-in memory circuit 300 is comprised of m rows of storage devices, each row containing n columns. Each line of sampled picture elements is transferred into the write-in memory circuit to be stored in a row, and each stored row of picture elements is transferred sequentially until a complete field, or vertical interval, of sampled picture elements is stored therein. The write-in memory circuit is responsive to write/transfer pulses $P_C$ to shift, or transfer, each row of stored picture elements from one row to the next. Once a complete field, or vertical interval, of picture elements (m rows of picture elements) is stored therein, the write/transfer pulses $P_C$ are supplied to write-in memory circuit 300 as m successive transfer pulses, whereby the field, or vertical interval, of sampled picture elements then is transferred row-by-row from the memory circuit into read-out memory circuit 500 via switching circuit 400. Accordingly, write-in memory circuit 300 is illustrated as having n input terminals coupled to respective ones of n output terminals of sample-and-hold circuit 200, and also having n output terminals coupled to respective input contacts of switching circuit 400.

The switching circuit is illustrated in FIG. 7 as an electromechanical change-over switch. As may be appreciated, switching circuit 400 may be comprised of conventional semiconductor switching devices. A switch control input of the switching circuit is connected to receive a switching pulse $S_W$, this switching pulse being determinative of the switching condition of the switching circuit. For example, in the presence of a switching pulse $S_W$, each switching element included in switching circuit 400 is connected so as to provide a transmission path from the n output terminals of write-in memory circuit 300 to corresponding ones of n input terminals of read-out memory circuit 500. When switching pulse $S_W$ terminates, all of the switching elements included in switching circuit 400 are conditioned so as to interrupt the transmission path from write-in memory circuit 300 to read-out memory circuit 500 and to establish a recirculating path from the n output terminals of the read-out memory circuit back to the n input terminals thereof, respectively.

Switching pulse $S_W$ is generated by a switching pulse generator 38 having input terminals coupled to synchronizing separator circuit 36 for receiving the separated horizontal synchronizing pulse H and the separated vertical synchronizing pulse V. Switching pulse generator 38 may include conventional gating and counting circuits for generating switching pulse $S_W$ having a duration equal to the vertical blanking interval of the incoming video signal. In a practical embodiment of the present invention, the effective vertical blanking interval, that is, the interval during which a line of video information is not displayed, may be substantially larger than the conventional NTSC vertical blanking interval. For example, if one field of an NTSC video signal is comprised of 262.5 horizontal line intervals, and if only 200 rows of light emitting elements are provided in panel 100 (m=200), then the effective vertical blanking interval for the purpose of the present invention extends for a duration of 62.5 horizontal line intervals (262.5−200).

Read-out memory circuit 500 is similar to write-in memory circuit 300, as will be shown hereinbelow with respect to FIG. 11. Suffice it to say that the read-out memory circuit is responsive to recirculating pulses $P_D$ to recirculate, on a row-by-row basis, all of the n sampled picture elements in each row. Read-out memory circuit 500 is adapted to store an entire field, or vertical interval, of sampled picture elements, and thus may include m rows of storage devices, each row containing n storage devices. In response to each recirculating pulse $P_D$, a row of stored picture elements is transferred, or shifted, into the next higher row of storage devices. For example, the sampled picture elements stored in row m are transferred into row m−1, the sampled picture elements which had been stored in row m−1 are transferred into row m−2, and so on, with the row of sampled picture elements which had been stored in the first row being transferred, or recirculated, into row m. Thus, after m recirculating pulses $P_D$ have been generated, the field, or vertical interval, of sampled picture elements will have been fully recirculated in read-out memory circuit 500.

The read-out memory circuit includes n output terminals which, in addition to being coupled to switching circuit 400, as illustrated, also are coupled to respective inputs of n comparators $C_1 \ldots C_n$ included in comparator circuit 600. Each comparator is adapted to compare the level of the sampled picture element supplied thereto with a reference signal $E_V$ which is supplied, in common, to each comparator. If the level of the sampled picture element exceeds the level of the reference signal $E_V$, then the comparator produces a first signal. However, if the level of the sampled picture element which is supplied to the comparator is less than the level of the reference signal $E_V$, then the comparator produces a second signal. In one embodiment, the first signal is a binary "0" and the second signal is a binary "1". In another embodiment, the first signal is a binary "1" and the second signal is a binary "0".

Reference signal $E_V$ is generated by a reference signal generator 39 which is coupled to synchronizing signal separator 36 for receiving the separated horizontal synchronizing pulses H and the separated vertical synchronizing pulses V. In accordance with one aspect of the present invention, reference signal generator 39 is a staircase generator to produce a reference signal $E_V$ having a staircase waveform. In one embodiment, the staircase waveform is of progressively increasing steps during each vertical interval, commencing at a minimum step and progressing to a maximum step. In accordance with another embodiment, the staircase waveform is constituted by progressively decreasing steps, commencing from a maximum step and progressing to a minimum step during a vertical interval. Accordingly, a staircase generator which can be used as reference signal generator 39 may be of conventional construction.

The staircase waveform produced by reference signal generator 39 has a period equal to the field, or vertical interval, period. That is, at the end of a vertical interval, the staircase waveform is recycled. The number of discrete brightness levels which can be displayed by panel 100 is determined by the number of discrete steps in the staircase waveform of reference signal $E_V$. Furthermore, the step interval, that is, the duration of each step of the staircase waveform, is equal to the aforementioned period during which m recirculating pulses $P_D$ are generated. As a practical embodiment, reference signal $E_V$ may be provided with 128 steps. Furthermore, each step may exhibit a step interval, or duration, equal to two horizontal line intervals. Hence, m recirculating pulses $P_D$ are produced during each two-line interval duration.

The n outputs of comparators $C_1 \ldots C_n$, respectively, of comparator circuit 600 are coupled to driving circuits $A_1 \ldots A_n$ in column drive circuit 800. Each driving circuit is described in greater detail below with respect to FIG. 13. Depending upon the signal produced by a respective comparator circuit $C_1 \ldots C_n$, the driving circuit coupled thereto may supply an energizing voltage, a sustaining voltage or an extinguishing voltage to a respective one of column conductors $Y_1 \ldots Y_n$. Another input of each of driving circuits $A_1 \ldots A_n$ is coupled to a control pulse generator 40 for receiving either a start pulse $S_T$, in accordance with one embodiment, or a reset pulse $S_R$, in accordance with another embodiment. Control pulse generator 40 is coupled to synchronizing signal separator circuit 36 and receives the separated horizontal synchronizing pulses H and the separated vertical synchronizing pulses V. In one embodiment, the control pulse generator generates a start pulse $S_T$ at the beginning portion of each vertical interval. When this start pulse is produced, all of driving circuits $A_1 \ldots A_n$ supply energizing voltages to column conductors $Y_1 \ldots Y_n$, respectively. Once start pulse $S_T$ terminates, the driving circuits are responsive to the signals supplied thereto by comparator circuits $C_1 \ldots C_n$, respectively, in order to produce either a sustaining voltage or an extinguishing voltage. In the embodiment wherein control pulse generator 40 generates a reset pulse $S_R$, all of driving circuits $A_1 \ldots A_n$ generate extinguishing voltages in response thereto. This reset pulse $S_R$ is generated by the control pulse generator at the completion of a vertical interval. As an example, the reset pulse $S_R$ may be generated during the initial portion of the next following vertical interval.

Row conductors $X_1 \ldots X_m$ are coupled to respective output terminals of a row driving circuit 700. The row driving circuit is coupled to control pulse generator 40 for receiving either the start pulse $S_T$ or the reset pulse $S_R$ generated thereby (depending upon the particular embodiment of this invention), and also is coupled to clock pulse generator 37 for receiving recirculating pulses $P_D$. As will be described in greater detail with respect to FIG. 12, row driving circuit 700 is adapted to supply enabling, or conditioning, pulses sequentially to each of row conductors $X_1, \ldots X_n$, and also to supply disabling, or de-conditioning, pulses sequentially to these row conductors. In one embodiment wherein the start pulse $S_T$ is supplied to the row driving circuit, recirculating pulses $P_D$ are supplied to row conductors $X_1 \ldots X_m$ as conditioning pulses during the start pulse interval. Thereafter, recirculating pulses $P_D$ are supplied to the row conductors as disabling pulses. Thus, the disabling pulses are supplied to row conductors $X_1 \ldots X_m$ during each step interval following the start pulse $S_T$. In the embodiment wherein the reset pulse $S_R$ is supplied to row driving circuit 700, recirculating pulses $P_D$ are supplied sequentially to row conductors $X_1 \ldots X_m$ as disabling pulses during the reset pulse interval. However, during the vertical interval preceding this reset pulse, the recirculating pulses $P_D$ are sequentially supplied to the row conductors as conditioning pulses. Hence, in this embodiment, conditioning pulses are supplied in sequence to row conductors $X_1 \ldots X_m$ during each step interval of reference signal $E_V$.

Briefly, in operation, an incoming video signal $S_V$ is supplied to sample-and-hold circuit 200 wherein each line of video information is sampled. n sampled picture elements are obtained in response to the n sampling pulses $P_A$ which are generated during each horizontal line interval. At the end of the line interval, a transfer pulse $P_B$ transfers all n sampled picture elements into a row of storage devices included in write-in memory circuit 300. Then, the next line of video information is sampled in the sample-and-hold circuit in response to sampling pulses $P_A$. At the conclusion of this line, the n sampled picture elements are transferred, in response to transfer pulse $P_B$, into the aforementioned row of storage devices in the write-in memory circuit, and the n sampled picture elements which previously had been stored therein now are transferred, in response to write/transfer pulse $P_C$, into the next row of storage devices. More particularly, the first row of sampled picture elements is stored in row m of storage devices in write-in memory circuit 300. Then, the next row of sampled picture elements is stored in row m of storage devices, while the row of sampled picture elements which had been stored in row m now are transferred into the next row m−1 of storage devices in write-in memory circuit 300. This sampling and transferring process continues, sequentially by row, until the first row of sampled picture elements is stored in the first row of storage devices in the write-in memory circuit, the second row of sampled picture elements is stored in the second row of storage devices, and so on, with the m-th row of picture elements being stored in the m-th row of storage devices in write-in memory circuit 300.

At the conclusion of a vertical interval, such as at the conclusion of a field of line intervals, a field of sampled picture elements is stored in write-in memory circuit 300. At that time, switching pulse generator 38 generates switching pulse $S_W$ to energize switching circuit 400 to the condition whereby the write-in memory circuit is coupled therethrough to read-out memory circuit 500. Also, m transfer pulses $P_C$, and m recirculating pulses $P_D$ are supplied to the write-in and read-out memory circuits, respectively, so that all of the n sampled picture elements in each row are transferred, sequentially on a row-by-row basis, into read-out memory circuit 500. In response to the first transfer pulse $P_C$ and the first recirculating pulse $P_D$, the first row of sampled picture elements is transferred, or shifted, into the m-th row of storage devices included in the read-out memory circuit, and the remaining rows of sampled picture elements in the write-in memory circuit all are shifted forward, or upward, by one row. In response to the next transfer pulse $P_C$ and recirculating pulse $P_D$, the row of sampled picture elements which is stored in the first row of storage devices in write-in memory circuit 300, which is seen to be the second row of sampled picture elements, that is, the sampled picture elements which are derived from the second line of video information, is shifted into the m-th row of storage devices in read-out memory circuit 500, while the first row of sample picture elements which had been stored in this m-th row of storage devices is shifted into the (m−1)-th row of storage devices. This transfer operation continues until m transfer pulses $P_C$ have been generated. At that time, the full contents of the write-in memory circuit will have been transferred into the read-out memory circuit. Hence, the write-in memory circuit now is conditioned to store the next field of sample picture elements; and the read-out memory circuit now stores the immediately preceding field of sampled picture elements therein. At this time, switching pulse $S_W$ terminates so as to interrupt the connection of write-in memory circuit 300 through switching circuit 400 to read-out memory circuit 500, and to establish the recirculating path from the output of the read-out memory circuit through the switching circuit and back to the input of the read-out memory circuit. Subsequent recirculating pulses $P_D$ thus recirculate the field of sampled picture elements in read-out memory circuit 500 sequentially on a line-by-line basis.

In accordance with one embodiment of this invention, to be described in greater detail below, after one complete field of sampled picture elements is stored in read-out memory circuit 500, start pulse $S_T$ is generated. Row driving circuit 700 is responsive to this start pulse to apply the successive recirculating pulses $P_D$ sequentially to row conductors $X_1 \ldots X_m$ as conditioning pulses therefor. At the same time, reference signal $E_V$ exhibits a relatively low step level, such as a minimum step level. Also, and as row conductors $X_1 \ldots X_m$ are conditioned in sequence, rows 1 ... m of sampled picture elements are recirculated through read-out memory circuit 500. That is, when row conductor $X_1$ is conditioned, the first row of sampled picture elements is read out of the read-out memory circuit and compared to reference signal $E_V$ in comparator circuits $C_1 \ldots C_n$, respectively. It is assumed at this time that all of these n sampled picture elements exceed the step level of reference signal $E_V$ and, therefore, a binary "0" is supplied from all of the comparator circuits to column driving circuits $A_1 \ldots A_n$, respectively. The start pulse $S_T$ also is supplied at this time to comparator circuits $A_1 \ldots A_n$, resulting in a discharge voltage supplied to column conductors $Y_1 \ldots Y_n$, respectively. Thus, all of the light emitting elements in row $X_1$ of panel 100 are discharged.

The next recirculating pulse $P_D$ is supplied as a conditioning pulse by row driving circuit 700 to row conductor $X_2$. However, a sustaining voltage is supplied to previously conditioned row conductor $X_1$. This next recirculating pulse $P_D$ also reads out the second row of sampled picture elements from read-out memory circuit 500 to comparator circuits $C_1 \ldots C_n$, respectively. It is assumed that these sampled picture elements also exceed the present step level of reference signal $E_V$, so that each of the comparator circuits supplies a binary "0" to column driving circuits $A_1 \ldots A_n$. However, the start pulse $S_T$, which still is present, energizes all of the column driving circuits to supply discharge voltages to column conductors $Y_1 \ldots Y_n$, respectively. Since row conductor $X_2$ is conditioned at this time, all of the light emitting elements disposed in this row are discharged.

The foregoing operation continues until a complete field of sampled picture elements has been read out from, and thus recirculated in, read-out memory circuit 500. It is appreciated that, once this field of sampled picture elements has been recirculated, all of the light emitting elements included in panel 100 will be discharging, and thus emitting light. Start pulse $S_T$ now terminates; and successive recirculating pulses $P_D$ are supplied by row driving circuit 700 sequentially to row conductors $X_1 \ldots X_m$ as disabling pulses. As a disabling pulse is supplied to a given row, a corresponding row of sampled picture elements is read out of read-out memory circuit 500 and compared to the then-existing step level of reference signal $E_V$. It is recalled that the staircase waveform of reference signal $E_V$ increases by one step level after a field of sampled picture elements is recirculated through the read-out memory circuit.

When a disabling pulse is supplied to row conductor $X_1$, the first row of sampled picture elements is compared to the step level of reference signal $E_V$. If the brightness level of a sampled picture element is less than the step level to which it is compared, a binary "1" is supplied by the respective comparator circuit to the column driving circuit connected thereto. This results in an extinguishing voltage supplied to the associated column conductor. For example, if the second picture element in row 1 is less than the level step of reference voltage $E_V$, comparator circuit $C_2$ supplies a binary "1" to column driving circuit $A_2$, resulting in an extinguishing voltage supplied to column conductor $Y_2$. The combination of this extinguishing voltage at column conductor $Y_2$ and the disabling pulse applied to row conductor $X_1$ serves to extinguish light emitting element $M_{12}$, which is at the intersection of $X_1$, $Y_2$. In a similar manner, the remaining light emitting elements in row 1 of panel 100 are selectively extinguished if the level of the corresponding sampled picture element is less than the step level of reference signal $E_V$.

In response to the next recirculating pulse $P_D$, a disabling pulse is supplied to column conductor $X_2$, and the second row of sampled picture elements is read out of read-out memory circuit 500 and compared to the step level of reference signal $E_V$. As before, if the level of a sampled picture element is less than the step level of the reference signal, then an extinguishing voltage is supplied to a corresponding column conductor. Consequently, selected light emitting elements in row 2 of panel 100 are extinguished, as a function of the brightness level of the corresponding sampled picture elements.

This operation continues until the m-th row of sampled picture elements is read out of, and recirculated back into, the read-out memory circuit. At that time, selected ones of the light emitting elements in panel 100 are extinguished, and the discharge condition of the remaining light emitting elements is sustained. Now, the reference signal $E_V$ is increased to its next step level. Then, the foregoing process is repeated, and successive rows of sampled picture elements are read out of, and recirculated back into, read-out memory circuit 500. As each row is read out of the read-out memory circuit and compared to the new step level of reference signal $E_V$, a disabling pulse is supplied to a corresponding row conductor. Accordingly, selected light emitting elements are extinguished on a sequential row-by-row basis. After a disabling pulse is supplied to row conductor $X_m$ and the m-th row of sampled picture elements is read out of read-out memory circuit 500, reference signal $E_V$ is increased to its next higher step level, and the foregoing process is repeated once again.

As the rows of sampled picture elements are recirculated through read-out memory circuit 500, successive lines of video signals are sampled by sample-and-hold circuit 200, and stored in write-in memory circuit 300. In accordance with a practical embodiment of this invention, two lines of incoming video signals are sampled and stored while a complete field of previously obtained picture elements is recirculated through read-out memory circuit 500.

As the step levels of reference signal $E_V$ increase, it is seen that a progressive number of light emitting elements will be extinguished. At the end of the vertical interval of the incoming video signals, substantially all of the light emitting elements will have been extinguished. Thus, the discharge duration of a given light emitting element is determined by the brightness level of its corresponding sampled picture element. This discharge duration establishes the brightness of the light emitted by the light emitting element. Thus, a large number of discrete brightness levels can be produced, while using relatively low current levels.

At the end of a vertical interval, the field of sampled picture elements stored in write-in memory circuit 300 is transferred into read-out memory circuit 500, and the aforedescribed process is repeated. Sample-and-hold circuit 200 then samples the lines of video signals included in the next vertical interval, and each row of sampled picture elements is stored in write-in memory circuit 300.

In accordance with another embodiment of this invention, a reset pulse $S_R$ is generated by control pulse generator 40 in place of the aforementioned start pulse $S_T$. The reset pulse is produced at the end of a vertical interval and, more particularly, at the initial portion of the next following vertical interval. This reset pulse is used by row driving circuit 200 to supply successive recirculating pulses $P_D$ as disabling pulses to row conductors $X_1 \ldots X_m$, sequentially. Furthermore, the reset pulse $S_R$ is supplied to all of column driving circuits $A_1 \ldots A_n$ to produce extinguishing voltages. Hence, all of the light emitting elements in rows 1 . . . m are extinguished in sequence on a row-by-row basis.

In this embodiment, the staircase waveform of reference signal $E_V$ starts at a maximum step level and progressively decreases throughout the vertical interval. During each step interval, that is, the interval during which the reference signal exhibits a constant step level, each row of sampled picture elements stored in read-out memory circuit 500 is read out therefrom in sequence, on a row-by-row basis, and compared to the then-existing step level. When the reference signal $E_V$ has been reduced to a step level which is exceeded by a sampled picture element, the corresponding comparator circuit supplies a binary "0" to the column driving circuit connected thereto, whereby the corresponding column conductor is supplied with a discharge voltage. Thus, the light emitting element in panel 100 which is positioned at the intersection of the row conductor to which a conditioning pulse is supplied and the column conductor which is supplied with a discharge voltage is energized. As a result thereof, the energized light emitting element emits light. This light emitting element then is sustained in its discharge condition until reset pulse $S_R$ is produced, at which time the light emitting element is extinguished.

Thus, during each step interval, a complete field of sampled picture elements is read out from read-out memory circuit 500 on a row-by-row basis and each picture element is compared to the step level of reference signal $E_V$. Depending upon the brightness level of a read out sampled picture element, a corresponding light emitting element is discharged. Thus, it is expected that, during each recirculating cycle of read-out memory circuit 500, selected light emitting elements are discharged. Then, at the completion of a recirculating cycle, reference signal $E_V$ is reduced to the next lower step level, and the foregoing process is repeated. Finally, at the end of a vertical interval, reference signal $E_V$ will be reduced to its minimum step level, and substantially all of the light emitting elements included in panel 100 will be discharged. At this time, a complete field of sampled picture elements will be stored in write-in memory circuit 300, and a switching pulse $S_W$ is supplied to switching circuit 400. This transfers the field of sampled picture elements from the write-in memory circuit to the read-out memory circuit, in preparation for the recurrence of the aforedescribed operations.

Figure 8:
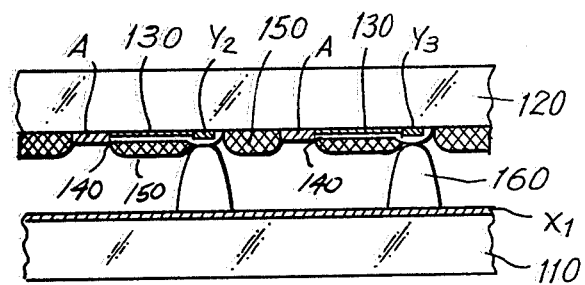
FIG. 8 is a sectional view of a portion of the flat panel of light emitting elements which can be used with the present invention.
Figure 9:
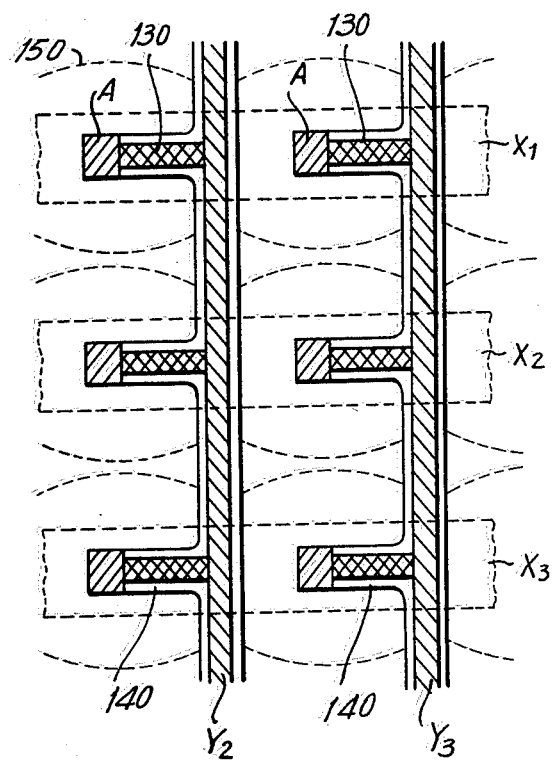
FIG. 9 is a top view of a portion of the panel shown in FIG. 8.

One embodiment of panel 100 is shown in FIGS. 8 and 9. FIG. 8 is a side view of the panel which includes a pair of glass plates 110 and 120 disposed in parallel, face-to-face relationship and separated from each other by a predetermined distance. Row conductors $X_1 \ldots X_m$ are deposited on the upper surface of glass plate 110, and column conductors $Y_1 \ldots Y_n$ are deposited on the lower surface of glass plate 120 such that the row and column conductors face each other. It is here assumed that each light emitting element included in panel 100 is a gas discharge device, and row conductors $X_1 \ldots X_m$ serve as cathode electrodes for the respective gas discharge devices. Each gas discharge device further includes an anode electrode A which is deposited on the bottom surface of glass plate 120, as shown in FIG. 8. An anode electrode A is provided in the vicinity of each intersection of a column conductor and a row conductor. A resistive layer 130 serves to electrically connect each anode electrode A to its respective column conductor, such as column conductor $Y_2$. Isolation glass members 140 are disposed over resistive layers 130 and column conductors $Y_1 \ldots Y_n$. A layer of fluorescent material 150 surrounds each anode electrode A and is centered on the anode electrode. Glass ribs 160 extend upward from glass plate 120 into contact with isolating glass members 140, these ribs being provided in parallel with conductor columns $Y_1 \ldots Y_n$, and function as discharge barriers.

By reason of the resistive layer 130 which electrically connects a column conductor to its respective anode electrodes A, each gas discharge device, or cell, is provided with hysteresis, or a memory effect. That is, once a discharge cell has been excited into its discharge condition, it will sustain that condition until extinguished. Similarly, once a discharge cell has been extinguished, it will sustain that condition until subsequently excited.

Figure 10:
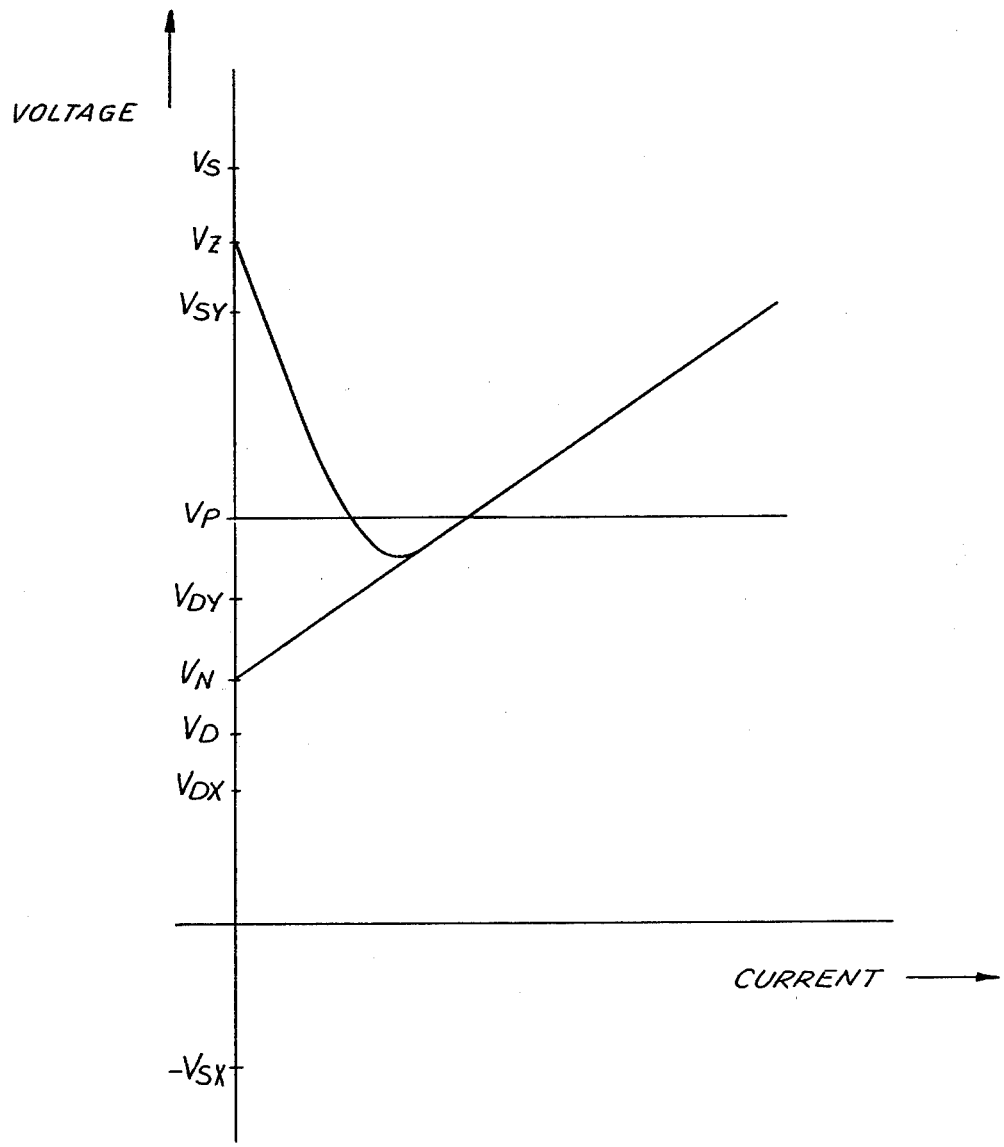
FIG. 10 is a voltage-current characteristic of a typical light emitting element in the X-Y array which can be used with the present invention.

A graphical depiction of the discharge characteristic of a typical gas discharge cell of the type shown in FIGS. 8 and 9 is illustrated in FIG. 10. It is assumed that voltage $V_Z$ is the firing, or discharge voltage which must be applied across the anode and cathode electrodes of the cell in order for the cell to be excited into its discharge condition. $V_N$ is the sustaining voltage which must be applied to the cell in order to sustain its discharge condition. Thus, if a voltage, such as $V_S$, which is higher than the firing voltage $V_Z$, is applied across the anode and cathode electrodes of the discharge cell, the cell will be excited into its discharge condition. This discharge condition will be sustained even if the voltage which is applied across the anode and cathode electrodes of the discharge cell is reduced below the firing voltage $V_Z$, but remains higher than the sustaining voltage $V_N$. Thus, if a quiescent voltage $V_P$ is applied across the anode and cathode electrodes, the discharge condition of the cell will be sustained. However, if the anode-cathode voltage is reduced to, for example, a voltage $V_D$, which is below the sustaining voltage $V_N$, the cell is extinguished. This discharged cell remains in its extinguished condition even if the anode-cathode voltage is increased above the sustaining voltage level $V_N$ but below the firing level $V_Z$. Even of the anode-cathode voltage is increased above the extinguishing level $V_D$ to, for example, the quiescent level $V_P$, the discharge cell will not be discharged until the firing level $V_Z$ is reached.

One embodiment of sample-and-hold circuit 200, write-in memory circuit 300, switching circuit 400 and read-out memory circuit 500 is illustrated in FIG. 11. In the interest of simplification, FIG. 11 represents that five sampled picture elements are obtained for each line interval (n=5) and that four lines of video signals are displayed (m=4). Of course, in a practical embodiment, n=280 and m=200. Sample-and-hold circuit 200 includes storage capacitors 211–215 and sampling transistors 221–225. Each sampling transistor is illustrated as a field effect transistor (FET), and the entire sample-and-hold circuit may be of MOS fabrication. FET's 221–225 have their gate electrodes connected in common to receive sampling pulses $P_A$. The drain (or source) of each FET is connected to a respective capacitor, and the source (or drain) of each is connected to the drain (or source) of an adjacent FET. FET's 221–225, in combination with capacitors 211–215, function as a bucket brigade device and, in the interest of simplification, various additional gating and control elements are not shown. The source (or drain) of FET 225 is coupled to an input terminal for receiving video signal $S_V$.

In response to a first sample pulse $P_A$, video signal $S_V$ is sampled by FET 225, and the sampled picture element is stored in capacitor 215. Then, in response to the next sample pulse $P_A$, the sampled picture element stored in capacitor 215 is transferred through FET 224 to storage capacitor 214, and FET 225 obtains the next sampled picture element of the incoming video signal. It may be appreciated that successive sampling pulses $P_A$ serve to transfer sampled picture elements from capacitor 214 to capacitor 213, and then to capacitor 212 and then to capacitor 211. Thus, after n sample pulses, n sampled picture elements are stored on capacitors 211–215. FET's 231–235 have their gate electrodes connected in common to receive transfer pulse $P_B$, and their drain-source circuits connected between capacitors 211–215 and capacitors 341–345, respectively, the latter capacitors being included in write-in memory circuit 300. Thus, in response to each transfer pulse $P_B$, the sampled picture elements which are stored on capacitors 211–215 are transferred via FET's 231–235 to capacitors 341–345, respectively.

Write-in memory circuit 300 is provided with m rows of storage capacitors. A first row of capacitors is comprised of capacitors 311–315, a second row of capacitors is comprised of capacitors 321–325, a third row of capacitors is comprised of capacitors 331–335 and the m-th row of capacitors is comprised of capacitors 341–345. Each row the capacitors is coupled to the next higher row of capacitors via respective FET's. Thus, the drain-source circuits of FET's 351–355 couple capacitors 341–345 to capacitors 331–335, respectively. Similarly, the drain-source circuits of FET's 361–365 couple capacitors 331–335 to capacitors 321–325, respectively. Finally, the drain-source circuits of FET's 371–375 couple capacitors 321–325 to capacitors 311–315, respectively. All of the gate electrodes of FET's 351–355, 361–365 and 371–375 are connected in common to receive write/transfer pulses $P_C$. It is appreciated that capacitors 311, 321, 331 and 341 are disposed in one column, this column including FET's 371, 361 and 351. Another column of capacitors is comprised of capacitors 312, 322, 332, and 342, this column also containing FET's 372, 362 and 352. The remaining capacitors and FET's are disposed in similarly arranged columns. Each column of capacitors and FET's functions as a bucket brigade device, and in the interest of simplification, the usual gating and control transistors and other semiconductor elements are not illustrated herein.

It is recalled that, in response to each transfer pulse $P_B$, the row of sampled picture elements which are stored on capacitors 211–215 is transferred to capacitors 341–345. This row of sampled picture elements is transferred by FET's 351–355 to capacitors 331–335 in response to the next write pulse $P_C$ which is synchronized with transfer pulse $P_B$. In response to the next write pulse $P_C$, the sampled picture elements which are stored on capacitors 331–335 are transferred through FET's 361–365 to capacitors 321–325; while the sampled picture elements which had been stored on capacitors 341–345 are transferred through FET's 351–355 to capacitors 331–335. Accordingly, the next row of sampled picture elements is stored on capacitors 341–345. The foregoing transfer operation is continued until m rows of sampled picture elements are stored on the respective rows of capacitors which are included in write-in memory circuit 300.

Switching circuit 400 is shown in FIG. 11 as an electromechanical switching arrangement of the type described above with respect to FIG. 7. Thus, it is appreciated that, in response to switching pulse $S_W$, switching circuit 400 connects write-in memory circuit 300 to read-out memory circuit 500. In the absence of switching pulse $S_W$, switching circuit 400 disconnects the write-in memory circuit from the read-out memory circuit, and now provides a recirculating path from the output of the read-out memory circuit back to its input.

The read-out memory circuit is of a construction similar to write-in memory circuit 300. Thus, a first row of storage capacitors 511–515 is provided, this row of storage capacitors being connected to the second row of storage capacitors 521–525 via FET's 581–585, respectively. The second of storage capacitors 521–525 is connected to the third row of storage capacitors 531–535 via FET's 571–575, respectively. This third row of storage capacitors is connected to the m-th row of storage capacitors 541–545 via FET's 561–565, respectively. A row of transfer FET's 551–555 is interconnected between the first row of capacitors 311–315 in write-in memory circuit 300 and the m-th row of capacitors 541–545 in read-out memory circuit 500 via switching circuit 400.

When switching circuit 400 is operated to connect the first row of storage capacitors 311–315 of the write-in memory circuit to the drain (or source) electrodes of FET's 551–555, the sampled picture elements which are stored on capacitors 311–315 are transferred to capacitors 541–545 in response to a recirculating pulse $P_D$. The next recirculating pulse $P_D$ is supplied in common to the gate electrodes of all of the FET's included in the write-in memory circuit, whereby the n sampled picture elements which are stored in the m-th row of capacitors 541–545 are transferred to the next higher row of capacitors 531–535, while capacitors 541–545 receive the next row of sampled picture elements from capacitors 311–315 of the write-in memory circuit. The sequential transfer of sampled picture elements continues from one row of capacitors to the next in read-out memory circuit 500 in response to successive recirculating pulses $P_D$ until all of the sampled picture elements which had been stored in write-in memory circuit 500 are transferred into read-out memory circuit 500. At that time, switching circuit 400 disconnects the output of the write-in memory circuit from the input of the read-out memory circuit, and now connects the output of the read-out memory circuit back to its input through a recirculating path. In this interconnection, further recirculating pulses $P_D$ serve to transfer the row of sampled picture elements stored on capacitors 511–515 to capacitors 541–545, while transferring the sampled picture elements from capacitors 521–525 to capacitors 511–515, the sampled picture elements from capacitors 531–535 to capacitors 521–525, and the sampled picture elements from capacitors 541–545 to capacitors 531–535. This transfer operation continues in response to subsequent recirculating pulses $P_D$, thereby recirculating the rows of sampled picture elements from one row of capacitors to the next higher row of capacitors on a sequential row-by-row basis. It is appreciated that, as each row of sampled picture elements is transferred to the first row of capacitors 511–515, these sampled picture elements also are provided at output terminals $500_1$–$500_5$ of the read-out memory circuit. Thus, in addition to recirculating the rows of picture elements, each row of picture elements also is read out non-destructively from the read-out memory circuit.

It should be appreciated that the circuitry shown in FIG. 11 has been significantly simplified in order to avoid unnecessary confusion. The respective bucket brigade devices are, in actual construction, more complicated. Furthermore, although MOS fabrication is preferred, whereby each FET is an MOS FET, other semiconductor fabrications can be used, as desired.

Figure 12:
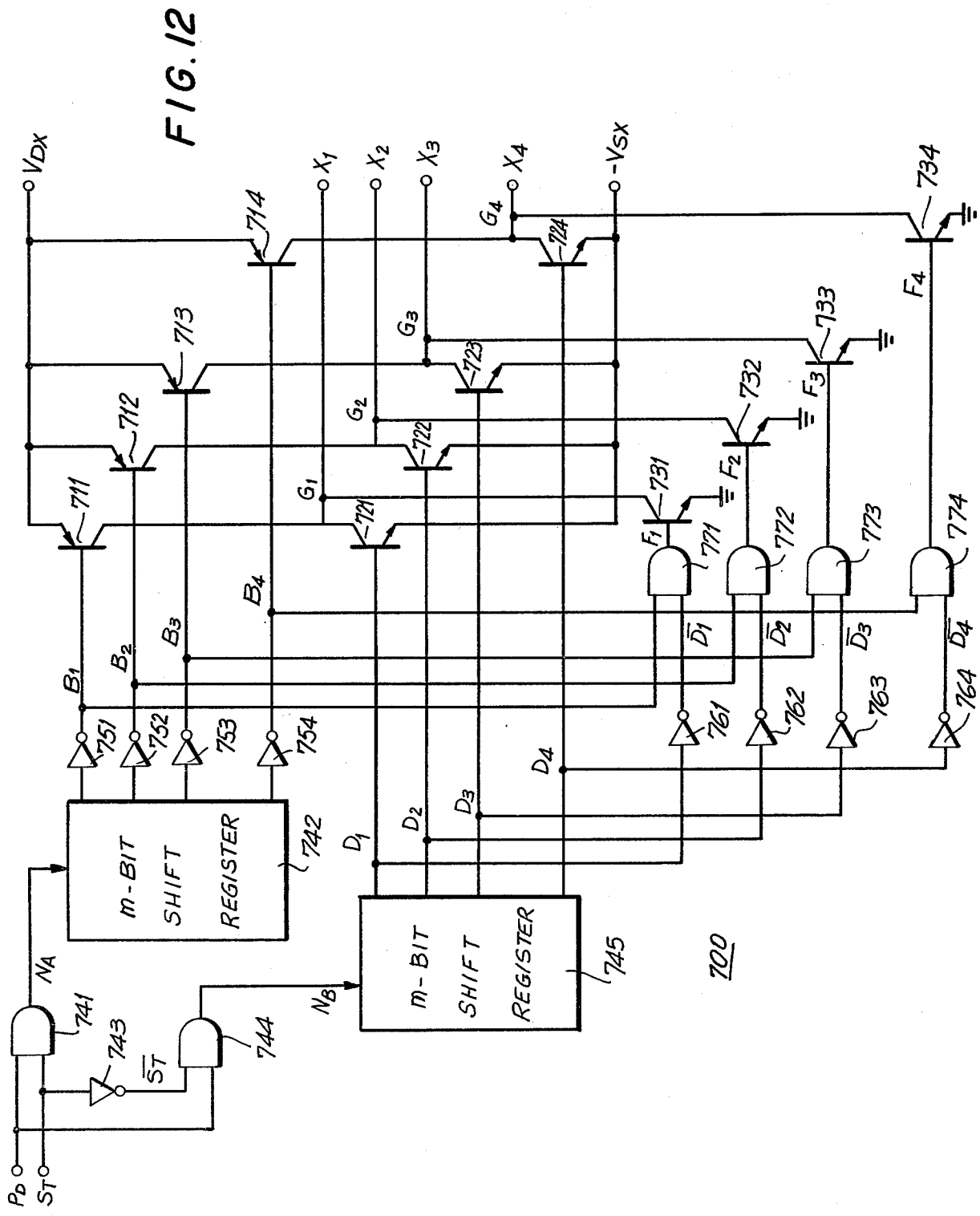
FIG. 12 is a logic diagram of one embodiment of row-driving circuitry for the X-Y array which can be used with the present invention.

Turning now to FIG. 12, there is illustrated a logic diagram of one embodiment of row driving circuit 700. The row driving circuit is comprised of two shift registers 742 and 745 of similar construction. For example, each shift register may be an m-bit shift register or, alternatively, may comprise a counter coupled to a decoder, the latter having m output terminals. Each shift register is adapted to be supplied with shift or counting pulses which are derived from recirculating pulses $P_D$. To this effect, the input terminal of shift register 742 is coupled to an AND gate 741 whose inputs are coupled to receive recirculating pulses $P_D$ and start pulses $S_T$ to produce disabling pulses $N_A$. The input of shift register 745 is coupled to an AND gate 744 which, in turn, has one of its inputs connected to receive recirculating pulses $P_D$ and the other of its inputs connected via an inverter 743 to receive start pulse signal $S_T$. AND gate 744 is adapted to produce conditioning pulses $N_B$.

In the interest of simplification, it is assumed that $m=4$. Hence, m-bit shift registers 742 and 745 are shown herein as 4-bit shift registers. As disabling pulses $N_A$ are supplied to shift register 742, a disabling pulse is produced at a respective output thereof, this disabling pulse being shifted sequentially from one output to the next. Similarly, as conditioning pulses $N_B$ are supplied to shift register 745, this shift register produces a conditioning pulse at a respective output thereof, this conditioning pulse being shifted sequentially from one output to the next. As an alternative, and in accordance with the assumed example wherein $m=4$, each shift register may comprise a 2-bit counter and a decoder, whereby the count of the 2-bit counter is incremented in response to each disabling or conditioning pulse supplied thereto, and the count thereof is decoded by the 2-bit decoder. Thus, a count of 00 results in an output, such as a binary "1" at the first output terminal, a count of 01 results in a binary "1" at the second output terminal, a count of 10 results in a binary "1" at the third output terminal, and a count 11 results in a binary "1" at the fourth output terminal.

Inverters 751–754 are connected to the respective outputs of shift register 742 for the purpose of inverting each disabling pulse so as to produce sequential disabling pulses $B_1 \ldots B_4$. The outputs of inverters 751–754 are coupled to the base electrodes of PNP transistors 711–714, respectively, and also to one input of each of AND gates 771–774, respectively. The emitter electrodes of transistors 711–714 are connected in common to a source of potential $V_{DX}$, and the collector electrodes of these transistors are connected to column conductors $X_1$–$X_4$, respectively.

Shift register 745 is responsive to conditioning pulses $N_B$ to produce sequential conditioning pulses $D_1$–$D_4$, respectively, at the outputs thereof. These outputs are connected to the base electrodes of NPN transistors 721–724, respectively, and in addition, are connected via inverters 761–764, respectively, to second inputs of AND gates 771–774. The emitter electrodes of transistors 721–724 are connected in common to a source of voltage $-V_{SX}$, and the collector electrodes thereof are connected to row conductors $X_1$–$X_4$, respectively.

The outputs of AND gates 771–774 are connected to the base electrodes of NPN transistors 731–734, respectively. The emitter electrodes of these transistors are connected in common to a reference potential, such as ground, and the collector electrodes thereof are connected to row conductors $X_1$–$X_4$, respectively.

It will be appreciated that, in a practical embodiment, shift registers 742 and 745 each may be provided with m outputs, sets of transistors 711–714, 721–724, and 731–734, each may be comprised of m transistors, and AND gates 771–774 may be comprised of m AND gates. In such a practical embodiment, $m=200$. Nevertheless, the principles of the present invention, and a complete understanding of the operation of this invention, will best be obtained by describing a simplified embodiment, such as shown in FIG. 12 wherein $m=4$.

Before describing the operation of the row driving circuit shown in FIG. 12, a typical column driving circuit will be discussed with reference to the embodiment shown in FIG. 13. The illustrated column driving circuit is assumed to correspond to column driving circuit $A_1$, shown in FIG. 7. This column driving circuit is comprised of a PNP transistor 801, an NPN transistor 802 and a diode 804. Transistor 801 has its emitter electrode connected to a source of voltage $V_{SY}$ and its collector electrode connected via a resistor 803 to a junction $J_1$ to which column conductor $Y_1$ is connected. The base electrode of transistor 801 is connected to receive the start pulse $S_T$.

Transistor 802 has its emitter electrode connected to a source of voltage $V_{DY}$ and its collector electrode connected to junction $J_1$. The base electrode of this transistor is connected to the output of comparator circuit $C_1$ to receive a signal $I_1$ produced by the comparator circuit.

Diode 804 has its cathode connected to junction $J_1$ and its anode connected via a resistor 805 to a source of voltage $V_P$. As shown in FIG. 13, and as described previously with respect to FIGS. 8 and 9, column conductor $Y_1$ is coupled via resistor 130 to anode A of the illustrated gas discharge device. The cathode of this gas discharge device is connected to row conductor $X_1$ which, in turn, is supplied with a signal $G_1$ which is produced at the junction defined by the collector electrodes of transistors 711, 721 and 731 (FIG. 12), which have been redrawn for convenience in FIG. 13.

The values of the various voltages $V_{SY}$, $V_P$, $V_{DY}$, $V_{DX}$ and $-V_{SX}$ are as shown in FIG. 10. In addition, and for a reason soon to be explained, the voltage $V_{SY}+V_{SX}$ is equal to a voltage $V_S$ greater than the firing voltage $V_Z$ of the gas discharge cell. Furthermore, the voltage $V_{DY}-V_{DX}$ is equal to $V_D$ which is less than the extinguishing voltage $V_N$.

Figure 13:
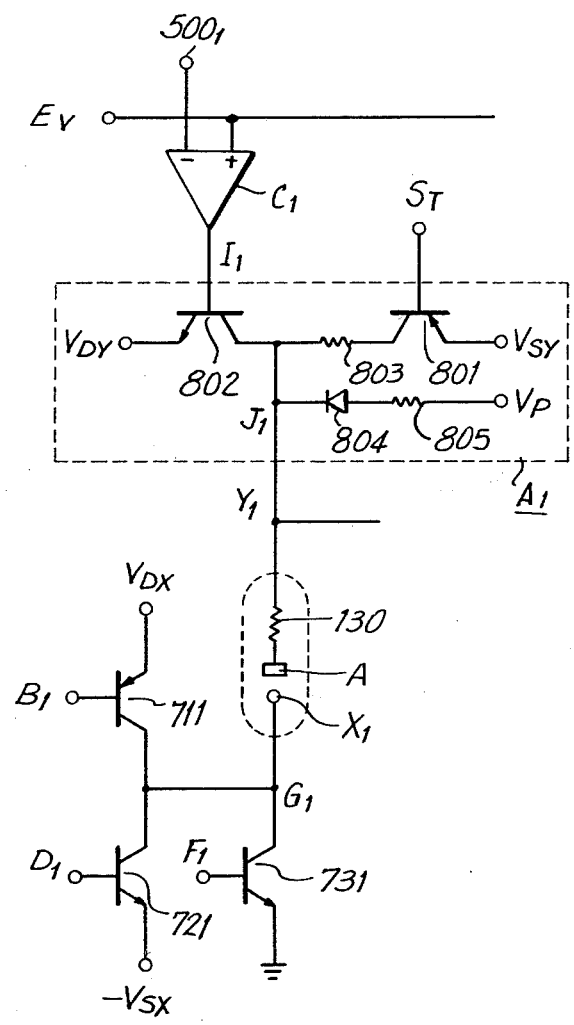
FIG. 13 is a schematic diagram of one embodiment of column driving circuitry which can be used with the X-Y array for the present invention.

It is appreciated that the circuit shown in FIG. 13 is a drive circuit for the gas discharge device $M_{11}$ which is positioned at the intersection of row $X_1$ and column $Y_1$. Comparator $C_1$, which is used to selectively control this gas discharge device, may be a differential amplifier, or the like, having its positive input terminal connected to receive the reference signal $E_V$ and its negative input terminal coupled to output $500_1$ of read-out memory circuit 500 (FIG. 11).

Referring to the waveform diagrams shown in FIGS. 14A–14H, the incoming video signal $S_V$ is illustrated in FIG. 14A having m line intervals in each vertical interval. It is here assumed that $m=4$, and that the vertical interval is the field interval. As is conventional, the video signal also includes periodic vertical blanking intervals $T_{VB}$ which are produced at the beginning (end) of each field interval.

FIG. 14B illustrates the reference signal $E_V$ as being constituted by a progressively increasing staircase waveform. Although in a practical embodiment, each step interval is equal to about two horizontal line intervals, FIG. 14B represents that each step interval is equal to one horizontal line interval. The minimum step level of the reference signal is produced during the first line interval $S_1$, and the maximum step interval is produced during the vertical blanking interval $T_{VB}$. In a practical embodiment, a number of step intervals are produced during the vertical blanking interval; and the vertical blanking interval in such a practical embodiment may be the effective vertical blanking interval which, for example, extends for a duration of about 62.5 horizontal line intervals.

FIG. 14C represents that switching pulse $S_W$ is generated during each vertical blanking interval of the incoming video signal. Thus, during this vertical blanking interval, the sampled picture elements which are stored in write-in memory circuit 300 are transferred via switching circuit 400 to read-out memory circuit 500.

FIG. 14D illustrates that n sampling pulses $P_A$ are produced during each horizontal line interval so that n sampled picture elements are obtained during each line interval. It is recalled that these n sampled picture elements are stored on capacitors 211–215 until a transfer pulse $P_B$ is produced at the end of a line interval (FIG. 14E). In response to this transfer pulse $P_B$, the n sampled picture elements are transferred into write-in memory circuit 300. Immediately prior to the occurrence of a transfer pulse $P_B$, a write/transfer pulse $P_C$, such as write pulse $P_{C1}$ is produced (FIG. 14F) to shift upwardly by one row each row of sampled picture elements which then are stored in the write-in memory circuit.

While rows of sampled picture elements are successively shifted into and through write-in memory circuit 300 in response to transfer pulses $P_B$ and write/transfer pulses $P_C$, recirculating pulses $P_D$, as shown in FIG. 14G, are produced. It is recalled that these recirculating pulses recirculate, on a sequential row-by-row basis, all of the rows of sampled picture elements which are stored in read-out memory circuit 500. As shown in FIG. 14G, m recirculating pulses $P_B$ are produced during each step interval of the reference signal $E_V$. Thus, during each step interval, one complete frame of sampled picture elements is recirculated through read-out memory circuit 500. The number of such recirculations, or cycles, is equal to the number of step intervals of the staircase waveform of reference signal $E_V$ during a vertical interval.

FIG. 14H represents that the start pulse $S_T$, which is a negative-going pulse, is produced during the first line interval $S_1$ of the incoming video signal. During this start pulse interval, each row of light emitting elements is energized sequentially on a row-by-row basis so as to be discharged. This is because, during the start pulse interval, transistor 801 (FIG. 13) in each column driving circuit $A_1 \ldots A_n$ is turned on to supply voltage $V_{SY}$ to each column conductor. Furthermore, during the start pulse interval, a conditioning pulse is supplied, in sequence, to each row conductor $X_1 \ldots X_m$. Hence, the anode-cathode voltage of each light emitting element in a row is supplied with a discharge voltage. Accordingly, as the sequential conditioning pulses are applied to row conductors $x_1 \ldots X_m$, the light emitting elements in these rows are discharged. As shown in FIG. 14H, m recirculating pulses $P_D$ are generated during a start pulse interval. When the first recirculating pulse $P_D$ is generated during this interval, the n light emitting elements in row 1, corresponding to the n picture elements of line interval $S_1$ of the incoming video signal, are discharged. During the second recirculating pulse $P_D$, the n light emitting elements in row 2, corresponding to the n picture elements in line interval $S_2$, are discharged. This process continues for each succeeding recirculating pulse during the start pulse interval, and is represented by the broken vertical lines shown in FIG. 14H during the second and third start pulse intervals.

At the end of a vertical interval, it is appreciated that write-in memory circuit 300 essentially is filled with sampled picture elements obtained from the immediately preceding vertical interval. During the following verticcal blanking period $T_{VB}$, write/transfer pulses $P_{C2}$ are generated in synchronism with recirculating pulses $P_D$ so as to sequentially shift, on a row-by-row basis, the contents of the write-in memory circuit into the read-out memory circuit through switching circuit 400. Thus, m write/transfer pulses $P_{C2}$ shift the m rows of sampled picture elements, which represent the video information in the immediately preceding vertical interval, into the read-out memory circuit. It is seen that, during the next following interval of the incoming video signal, panel 100 is selectively discharged so as to display the video picture which is represented by the sampled picture elements obtained from the preceding vertical interval, and now stored in and recirculated through read-out memory circuit 500.

Turning now to FIGS. 15A–15Z, the waveforms illustrated therein represent the manner in which column conductors $X_1$–$X_4$ are sequentially energized in response to recirculating pulses $P_D$ and start pulse $S_T$. The reference signal $E_V$ is shown in FIG. 15A as being comprised of w step levels during a vertical interval. In the interest of simplification, it is assumed that the vertical interval of the incoming video signal is formed of 200 line intervals (m=200) and that each step interval of the reference signal is equal to a line interval. It is further assumed that the vertical blanking interval extends for a duration equal to one horizontal line interval, and that reference signal $E_V$ reaches its maximum step level during this vertical blanking interval. In a practical embodiment, it is appreciated that m=200, w=128, the vertical blanking interval is equal to about 62.5 line intervals and that the reference signal $E_V$ is provided with about 128 step levels during the vertical blanking interval.

When recirculating pulses $P_D$ (FIG. 15B) and the start pulse $S_T$ (FIG. 15C) are combined in AND gate 741, disabling pulses $N_A$ (FIG. 15D) are produced, these disabling pulses being coincident with the recirculating pulses $P_D$ during the positive interval of the start pulse. These disabling pulses $N_A$ are applied to m-bit shaft register 742 which produces output pulses sequentially at its respective output terminals. These output pulses are of a positive sense, similar to disabling pulses $N_A$, and are inverted by inverters 751–754 to produce the sequential negative-going disabling pulses $B_1$–$B_4$, as shown in FIGS. 15E–15H, respectively. As shown herein, m disabling pulses $N_A$ are produced during each step interval of reference signal $E_V$. Thus, the last disabling pulse $B_4$ is produced during an end portion of a step interval, and shift register 742 then is recycled to produce the sequential disabling pulses (FIGS. 15E–15H), during the next step interval of the reference signal.

AND gate 744 is provided with an inverted version of the start pulse $\overline{S_T}$, produced by inverter 743. Accordingly, AND gate 744 generates conditioning pulses $N_B$ (FIG. 15J), which are of a positive sense, during the interval of the inverted start pulse $\overline{S_T}$. Shift register 745 provides successive conditioning pulses $D_1$–$D_4$ (FIGS. 15K–15N) at its output terminals, in sequence, in response to the conditioning pulses $N_B$ supplied thereto. Thus, as shown in FIGS. 15K–15N, sequential conditioning pulses $D_1$–$D_4$ are produced during each start pulse interval.

Inverters 761-764 invert the sense of conditioning pulses $D_1$–$D_4$ to supply inverted pulses $\overline{D_1}$–$\overline{D_4}$ (FIGS.

15O–15R) to AND gates 771–774, respectively. Disabling pulses $B_1$–$B_4$ (FIGS. 15E–15H) likewise are supplied to AND gates 771–774. Since disabling pulses $B_1$–$B_4$ and the inverted conditioning pulses $\overline{D_1}$–$\overline{D_4}$ normally are of a relatively higher level, the pulse signals $F_1$–$F_4$ produced by AND gates 771–774 normally are of a relatively high level except when either a disabling pulse or an inverted conditioning pulse is supplied thereto, at which time a negative-going pulse is produced, as shown in FIGS. 15S–15V. It is seen that pulses $F_1$–$F_4$ are produced in sequence during each step interval of reference signal $E_V$. Of course, in a practical embodiment, m pulses $F_1 \ldots F_m$ are produced during each step interval of the reference signal. Similarly, m disabling pulses $B_1 \ldots B_m$ are produced during each step interval of the reference signal, and m conditioning pulses $D_1 \ldots D_m$ are produced during the start pulse interval.

Since pulses $F_1$–$F_4$ normally are of a relatively high level, transistors 731–734 normally are turned ON, except for those negative-going portions of pulses $F_1$–$F_4$. Hence, when transistors 731–734 are turned ON, voltage $G_1$–$G_4$ which are applied to row conductors $X_1$–$X_4$, respectively, normally are at ground level, as shown in FIGS. 15W–15Z. During the start pulse interval, when pulses $F_1$–$F_4$ are of a negative sense, transistors 731–734 are turned OFF. These negative-going pulses $F_1$–$F_4$ coincide with positive-going conditioning pulses $D_1$–$D_4$, respectively. These conditioning pulses turn ON transistors 721–724, respectively. When these transistors are turned ON, the voltage level $-V_{SX}$ is supplied to row conductors $X_1$–$X_4$. Thus, during the start pulse interval, voltages $G_1$–$G_4$ undergo negative transitions from the zero voltage level to the $-V_{SX}$ level, as shown in FIGS. 15W–15Z.

Following the start pulse interval, pulses $F_1$–$F_4$ undergo negative transitions in coincidence with the negative-going disabling pulses $B_1$–$B_4$. Thus, following the start pulse interval, when transistors 731–734 are turned OFF, negative-going disabling pulses $B_1$–$B_4$ turn ON transistors 711–714. When these transistors are turned ON, the voltage level $V_{DX}$ is supplied to row conductors $X_1$–$X_4$. Thus, and as shown in FIGS. 15W–15Z, when the start pulse $S_T$ (FIG. 15C) is at its relatively higher level, disabling pulses $B_1$–$B_4$ produce positive-going voltage pulses $G_1$–$G_4$, respectively. It is seen that these positive-going voltage pulses have a level equal to $V_{DX}$.

Voltage $G_1$, which is applied to row conductor $X_1$, is provided with a periodic negative-going conditioning pulse whose period is equal to $T_1$. This period is equal to the vertical interval. Similarly, voltage $G_2$, which is supplied to row conductor $X_2$, is provided with a negative-going periodic conditioning pulse whose period is equal to $T_2$. This period also is equal to the vertical interval. Similarly, voltages $G_3$ and $G_4$ are provided with periodic negative-going conditioning pulses of periods $T_3$ and $T_4$, respectively. It is further appreciated that the respective negative-going conditioning pulses of voltages $G_1$–$G_4$ are sequentially offset with respect to each other, so that row conductors $X_1$–$X_4$ are provided with time-sequential conditioning pulses. Similarly, during each step interval of reference signal $E_V$, voltages $G_1$–$G_4$ are provided with disabling pulses which are offset with respect to each other. Thus, following the start pulse interval, row conductors $X_1$–$X_4$ are provided with repeating time-sequential disabling pulses. That is, each row conductor is provided with a disabling pulse once during each step interval.

Referring now to FIGS. 16A–16R, the manner in which column conductor $Y_1$ is energized for m (m=4) successive rows of sampled picture elements is illustrated. FIGS. 16A–16C are the now-recognized waveforms of the switching pulse $S_W$, the recirculating pulse $P_D$ and the start pulse $S_T$, illustrated previously in FIGS. 14C, 14G and 14H, respectively. Since the present discussion is concerned only with the manner in which column conductor $Y_1$ is driven, it is assumed that a first sampled picture element (sample 1) is stored on capacitor 511 (FIG. 11), a second sampled picture element (sample 2) is stored on capacitor 521, a third sampled picture element (sample 3) is stored on capacitor 531 and an m-th sampled picture element (sample 4) is stored on capacitor 541. Although not shown herein, it is appreciated that sampled picture elements are stored on capacitors 512, 522, 532 and 542, sampled picture elements are stored on capacitors 513, 523, 533 and 543, and so on. Thus, sample 1 corresponds to the sampled picture element in row 1, column 1 of the array of capacitors in read-out memory circuit 500, sample 2 corresponds to the sampled element in row 2, column 1 of this array, sample 3 corresponds to the sampled element in row 3, column 1 of this array, and sample 4 corresponds to the sampled picture element in row 4, column 1 of this array. The amplitude of these samples, shown in FIG. 16D, represents the brightness level of the corresponding sampled picture element. In FIG. 16D, the staircase waveform of reference signal $E_V$ is superimposed onto the illustrated sample levels.

Upon the occurrence of the negative-going start pulse $S_T$, transistor 801 (FIG. 13) is turned ON to supply the voltage $V_{SY}$ to junction $J_1$, as shown in FIG. 16F. During this start pulse interval, reference signal $E_V$ assumes its minimum level, which is shown to be less than the expected brightness levels of samples 1–4. Thus, transistor 802 remains OFF.

Voltages $G_1$–$G_4$, which are applied to row conductors $X_1$–$X_4$, and which have been shown previously in FIGS. 15W–15Z, are redrawn as FIGS. 16G–16J. When voltage $G_1$ is applied to row conductor $X_1$ during the start pulse interval, the cathode voltage is seen to be equal to $-V_{SX}$, while the anode voltage $J_1$ is seen to be equal to $V_{SY}$. Thus, the anode-cathode voltage across light emitting element $M_{11}$, that is, the light emitting element disposed at row 1, column 1, of panel 100, is equal to $V_{SY}+V_{SX}$. It has been assumed that this voltage is equal to $V_S$ which exceeds the discharge voltage for the light emitting element. Thus, the anode-cathode voltage $V_S$ is sufficient to discharge light emitting element $M_{11}$, as shown in FIG. 16K. At the conclusion of the conditioning pulse of voltage $G_1$, this voltage returns to its zero level. Hence, the anode-cathode voltage now provided across light emitting element $M_{11}$ is equal to $V_{SY}$, which is greater than the sustaining voltage. Accordingly, light emitting element $M_{11}$ remains discharged throughout the remainder of the start pulse interval.

Similarly, when the conditioning pulse of voltage $G_2$ is applied to row conductor $X_2$ during the start pulse interval, the anode-cathode voltage across light emitting element $M_{21}$ (disposed at row 2, column 1 of panel 100) is equal to $V_S$, thus discharging this light emitting element. Following the termination of this conditioning pulse, voltage $G_2$ returns to its zero level. The anode-cathode voltage across light emitting element $M_{21}$ then is reduced to the voltage level $V_{SY}$, which exceeds the sustaining voltage of the light emitting element, thus maintaining the light emitting element in its discharge condition throughout the remainder of the start pulse interval.

In a like manner, during the start pulse interval, light emitting element $M_{31}$ is discharged when voltage $G_3$, which is applied to row conductor $X_3$, is provided with a conditioning pulse; and light emitting element $M_{41}$ is discharged when voltage $G_4$, which is applied to row conductor $X_4$, is provided with a conditioning pulse. Hence, during the start pulse interval, the anode-cathode voltages across light emitting elements $M_{11}$–$M_{41}$ are as shown in FIGS. 16K–16N, respectively. As represented by the "o" adjacent the positive pulses in FIGS. 16K–16N, light emitting elements $M_{11}$–$M_{41}$ are discharged, sequentially on a row-by-row basis, during the start pulse interval.

During the next step interval following the start pulse interval, it is assumed that each of samples 1–4, stored on capacitors 511, 521, 531 and 541, respectively, exceed the step level of the reference signal $E_V$. Since the start pulse $S_T$ (FIG. 16C) now is of a relatively high level, transistor 801 is turned OFF. Also, the output $I_1$ of comparator circuit $C_1$ is assumed to be a relatively low level, such as a binary "0", whenever the level of a sampled picture element exceeds the step level of reference signal $E_V$. Thus, output $I_1$ is a binary "0" for each of samples 1–4—as shown in FIG. 16E. Therefore, diode 804 supplies junction $J_1$ with the quiescent voltage $V_P$, as shown in FIG. 16F.

When sample 1 is on capacitor 511, row conductor $X_1$ is provided with voltage $G_1$ having the disabling pulse of amplitude $V_{DX}$ (FIG. 16G). Accordingly, the anode-cathode voltage across light emitting element $M_{11}$ is equal to $V_P - V_{DX}$, as shown in FIG. 16K. This anode-cathode voltage is greater than the extinguishing voltage and, therefore, the discharge condition of light emitting element $M_{11}$ is sustained. At the termination of the disabling pulse, voltage $G_1$ returns to its zero level, and the anode-cathode voltage across light emitting element $M_{11}$ is equal to the quiescent voltage $V_P$. This quiescent voltage also is greater than the extinguishing voltage which is needed to terminate the discharge condition of light emitting element $M_{11}$.

In response to the next recirculating pulse $P_D$, sample 2 is shifted to capacitor 511, and voltage $G_2$, which is applied to row conductor $X_2$, is provided with a disabling pulse of amplitude $V_{DX}$ (FIG. 16H). Since the level of sample 2 is greater than the step level of reference signal $E_V$, transistor 802 remains OFF, and the quiescent voltage $V_P$ is supplied by diode 804 to junction $J_1$. Hence, the anode-cathode voltage across light emitting element $M_{21}$ is equal to $V_P - V_{DX}$ (the voltage at junction $J_1$ minus the disabling pulse amplitude of voltage $G_2$). This anode-cathode voltage is greater than the extinguishing voltage and, therefore, light emitting element $M_{21}$ remains in its discharge condition. When voltage $G_2$ returns to its zero level, the anode-cathode voltage across light emitting element $M_{21}$ is increased to the quiescent voltage level $V_P$, as shown in FIG. 16L.

In response to the next recirculating pulse $P_D$, sample 3 is shifted into capacitor 511 and voltage $G_3$, which is applied to row conductor $X_3$, is provided with the disabling pulse of amplitude $V_{DX}$. Since sample 3 exceeds the step level of reference signal $E_V$, transistor 802 remains OFF, and the quiescent voltage $V_P$ is applied to junction $J_1$. The anode-cathode voltage across light emitting element $M_{31}$ is equal to $V_P - V_{DX}$ (FIG. 16M), which is greater than the extinguishing voltage. Hence, light emitting element $M_{31}$ remains in its discharge condition. When voltage $G_3$ returns to its zero level, the anode-cathode voltage across light emitting element $M_{31}$ is increased to the quiescent voltage $V_P$.

Upon the occurrence of the next recirculating pulse, sample 4 is shifted into capacitor 511, and voltage $G_4$, which is applied to row conductor $X_4$, is provided with the disabling pulse of amplitude $V_{DX}$. Hence, the anode-cathode voltage across light emitting element $M_{41}$ is equal to $V_P - V_{DX}$, thus maintaining this light emitting element in its discharge condition. When voltage $G_4$ returns to zero, the anode-cathode voltage across light emitting element $M_{41}$ returns to the quiescent voltage level $V_P$.

As shown in FIG. 16D, the step level of reference signal $E_V$ is increased subsequent to the shifting of sample 4 into capacitor 511. That is, after the contents of read-out memory 500 have been fully recirculated therein, the step level of the reference signal is increased to its next higher level. It is assumed that the brightness level of the sampled picture element corresponding to sample 1 is less than this step level, but that samples 2, 3 and 4 all are greater than this step level. Therefore, in response to the next recirculating pulse $P_D$, sample 1 is shifted to capacitor 511 and voltage $G_1$ is provided with the disabling pulse of amplitude $V_{DX}$. Now, the step level of reference signal $E_V$ is greater than the level of sample 1, resulting in a binary "1" at output $I_1$ (FIG. 16E), which turns ON transistor 802. Consequently, junction $J_1$ is supplied with an extinguishing voltage $V_{DY}$.

The anode-cathode voltage across light emitting element $M_{11}$ now is equal to the difference between the voltage provided at junction $J_1$ and voltage $G_1$. This anode-cathode voltage is seen to be equal to $V_{DY} - V_{DX} = V_D$, which is less than the extinguishing voltage needed to terminate the discharge condition of this light emitting element. Thus, as shown in FIG. 16K, and as represented by the "x" adjacent the negative-going pulse of amplitude $V_D$, light emitting element $M_{11}$ is extinguished. When voltage $G_1$ returns to its zero level, the anode-cathode voltage across light emitting element $M_{11}$ is equal to $V_{DY}$, which is less than the discharge voltage that is needed to discharge this light emitting element. Hence, light emitting element $M_{11}$ now remains in its extinguished condition until a discharge voltage is applied thereacross.

In response to the next recirculating pulse $P_D$, sample 2 is shifted to capacitor 511 and is compared to the step level of reference signal $E_V$. As shown in FIG. 16D, sample 2 exceeds the step level and, therefore, transistor 802 is turned OFF. As a consequence thereof, the quiescent voltage $V_P$ is applied to junction $J_1$, and even when voltage $G_2$ is provided with a disabling pulse, the anode-cathode voltage across light emitting element $M_{21}$ is greater than the extinguishing voltage. Thus, this light emitting element remains in its discharge condition.

Similarly, upon the occurrence of the next two successive recirculating pulses $P_D$, samples 3 and 4 are sequentially shifted to capacitor 511. Since these samples are greater than the step level of reference signal $E_V$, light emitting elements $M_{31}$ and $M_{41}$ remain in their respective discharge conditions, as shown in FIGS. 16M and 16N.

Subsequent to the shifting of sample 4 to capacitor 511, the step level of reference signal $E_V$ is increased to its next higher step, as shown in FIG. 16D. Upon the occurrence of the next recirculating pulse $P_D$, sample 1 is shifted to capacitor 511 and is compared to reference signal $E_V$. It is appreciated that this sample still is less than the step level of the reference signal and, therefore, light emitting element $M_{11}$ remains in its extinguished condition.

Upon the occurrence of the next recirculating pulse $P_D$, sample 2 is shifted to capacitor 511 and voltage $G_2$ is provided with the disabling pulse. It has been assumed that sample 2 still is greater than reference signal $E_V$, so that transistor 802 is turned OFF. Thus, the quiescent voltage $V_P$ is applied to the anode electrode of light emitting element $M_{21}$, and the anode-cathode voltage is seen to be equal to $V_P-V_{DX}$, which is greater than the extinguishing voltage. Hence, light emitting element $M_{21}$ remains in its discharge condition.

Upon the occurrence of the next recirculating pulse $P_D$, sample 3 is shifted to capacitor 511, and voltage $G_3$ is provided with the disabling pulse. It is assumed that sample 3 now is less than this step level of reference signal $E_V$, and transistor 802 is turned ON thereby. Thus, the voltage at junction $J_1$ now is reduced to the extinguishing voltage $V_{DY}$, and the anode-cathode voltage across light emitting element $M_{31}$ is equal to $V_{DY}-V_{DX}=V_D$. This anode-cathode voltage is less than the extinguishing voltage and, therefore, light emitting element $M_{31}$ is extinguished, as shown in FIG. 16M. When voltage $G_3$ returns to its zero level, the anode-cathode voltage across light emitting element $M_{31}$ is increased to the level $V_{DX}$. However, this anode-cathode voltage is not sufficient to return the light emitting element to its discharge condition. Hence, light emitting element $M_{31}$ remains in its extinguished condition until a subsequent discharge voltage is applied thereacross.

Upon the occurrence of the next recirculating pulse $P_D$, sample 4 is shifted to capacitor 511 and voltage $G_4$ is provided with the disabling pulse. It is assumed that sample 4 is equal to the peak white level, which is greater than the step level of reference signal $E_V$. Hence, transistor 802 is turned OFF so that the quiescent voltage $V_P$ is applied to junction $J_1$ and to the anode of light emitting element $M_{41}$. Thus, the anode-cathode voltage across light emitting element $M_{41}$ is equal to $V_P-V_{DX}$, which is greater than the extinguishing voltage. Therefore, light emitting element $M_{41}$ remains in its discharge condition, as shown in FIG. 16N.

Following the shifting of sample 4 to capacitor 511, reference signal $E_V$ is increased to its next higher step, and sample 1 is shifted to capacitor 511. This also commences the vertical blanking interval, and switching pulse $S_W$ is generated, as shown in FIG. 16A. This means that the next set of m (m=4) recirculating pulses $P_D$ will shift samples 1-4 out of read-out memory circuit 500 and will shift the sampled picture elements which have been obtained from the just-ended vertical interval into the read-out memory circuit.

It is here assumed that samples 1, 2 and 3 all are less than the step level of reference signal $E_V$. Accordingly, light emitting elements $M_{11}$ and $M_{31}$ remain in their extinguished conditions. When sample 2 is shifted to capacitor 511 and is compared to reference signal $E_V$, the fact that the level of this sample now is less than the step level of the reference signal means that transistor 802 is turned ON to supply the extinguishing voltage to junction $J_1$, and to the anode of light emitting element $M_{21}$. Since voltage $G_2$ is provided with the disabling pulse, it is seen that the anode-cathode voltage across light emitting element $M_{21}$ is equal to $V_{DY}-V_{DX}=V_D$. This anode-cathode voltage is less than the extinguishing voltage, thereby terminating the discharge condition of light emitting element $M_{21}$.

In the example shown in FIG. 16D, it has been assumed that the level of sample 4 is equal to the peak white level, and that the maximum step level of reference signal $E_V$ is less than this peak white level. Therefore, even when the reference signal obtains its maximum step level, sample 4 is greater than the reference signal, and the quiescent voltage $V_P$ is supplied to the anode of light emitting element $M_{41}$. Therefore, this light emitting element is assumed to remain in its discharge condition throughout the period of the illustrated staircase waveform.

FIGS. 16O-16R represent the discharge duration of light emitting elements $M_{11}$-$M_{41}$, respectively. It is appreciated that this discharge duration is a function of the level of the respective samples 1-4 and the number of step levels of reference signal $E_V$. The discharge condition $L_{11}$ (FIG. 16O) of light emitting element $M_{11}$ commences when the discharge voltage $V_S$ is applied across the anode and cathode of this light emitting element, and terminates when the extinguishing voltage $V_D$ is applied thereacross. Similarly, the discharge condition $L_{21}$ (FIG. 16P) of light emitting element $M_{21}$ commences when the discharge voltage $V_S$ is applied across the anode and cathode thereof, and terminates when the extinguishing voltage $V_D$ is applied across light emitting element $M_{21}$. Also, the discharge condition $L_{31}$ (FIG. 16Q) of light emitting element $M_{31}$ commences when the discharge voltage $V_S$ is applied across the anode and cathode thereof, and terminates when the extinguishing voltage $V_D$ is applied across light emitting element $M_{31}$. The discharge condition $L_{41}$ (FIG. 16R) of light emitting element $M_{41}$ commences when the discharge voltage $V_S$ is applied across the anode and cathode thereof, and is seen to continue throughout the remainder of the vertical interval because sample 4, which is the corresponding picture element for light emitting element $M_{41}$, is assumed to be equal to the peak white level, and thus greater than the maximum step level of the reference signal.

It is appreciated that FIGS. 16A-16R represent the manner in which the m light emitting elements in column $Y_1$ are selectively discharged and extinguished. The remaining light emitting elements in columns $Y_2$ . . . $Y_n$ are selectively discharged and extinguished in a similar manner. Sample 1 in each column is read out in parallel and applied to comparator circuits $C_1 \ldots C_n$ in response to the first recirculating pulse $P_D$. Then, the second sample in each column is read out in parallel and supplied to a respective comparator circuit $C_1 \ldots C_n$ in response to the second recirculating pulse $P_D$. The remaining samples are read out in parallel by column, and sequential by row, in response to the next successive recirculating pulses $P_D$. Thus, during each step level of reference signal $E_V$, the levels of all of the sampled picture elements are detected on a row-by-row basis, and the detected levels are used to selectively extinguish their corresponding light emitting elements.

In the example described hereinabove, it has been assumed that the level of sample 4 in FIG. 16D is equal to the peak white level and, therefore, is greater than the maximum step level of reference signal $E_V$. If desired, the maximum step level of the reference signal may be greater than the peak white level. Alternatively, if the sampled picture elements all lie between the black and peak white levels, it is seen that all of the light emitting elements will be discharged during the start pulse interval $S_T$, and will be selectively extinguished at sometime following this start pulse interval during the vertical interval over which the reference signal increases in level toward its maximum step level. However, in the assumed example, a light emitting element corresponding to a sampled picture element whose level is equal to the peak white level is not extinguished. Therefore, if the level of a sampled picture element is between the black and peak white levels, the corresponding light emitting element will be discharged for a duration greater than a line interval and less than the vertical interval, as a function of the brightness of the sampled picture element. In a practical embodiment, the step interval of reference signal $E_V$ may be equal to two line intervals. Thus, if all of the light emitting elements are discharged during the start pulse interval, it is seen that the minimum discharge duration is equal to one step interval, which is equal to two line intervals.

As shown in FIGS. 16A and 16C, at the termination of switching pulse $S_W$, the next start pulse $S_T$ is produced. Hence, the aforedescribed operation is repeated to selectively energize the panel of light emitting elements in accordance with the sampled picture elements which are obtained from the immediately preceding vertical interval.

From the foregoing description, it is appreciated that there is no interference in the discharge of two or more light emitting elements which are connected in the same column. Thus, light emitting element $M_{11}$ is discharged and extinguished independently of the operation of light emitting element $M_{21}$. It now will be shown that two or more light emitting elements which are disposed in the same row, and thus have a common cathode electrode, also are operated substantially independently of each other without undesired interference therebetween. Referring to FIGS. 17A-17N, the waveforms shown in FIGS. 17A-17F are substantially the same as the aforedescribed waveforms shown in FIGS. 16A-16F, respectively. In the interest of simplification, in FIG. 17D, only sample 1 of the first line of video signals is depicted. That is, sample 1 shown in FIG. 17D is associated with, and thus is used to selectively discharge and extinguish, light emitting element $M_{11}$, which is disposed at row 1, column 1, of panel 100.

FIG. 17G is a waveform diagram showing the level of sample 2 in line 1, that is, the sampled picture element associated with light emitting element $M_{12}$, which is disposed at row 1, column 2. In addition, in FIG. 17G, the staircase waveform of reference signal $E_V$ is superimposed over sample 2 of line 1.

It is appreciated that, during the start pulse interval, transistor 801 included in column driving circuit $A_2$ which is connected to column conductor $Y_2$ is turned ON to supply the discharge voltage, also referred to herein as the initializing voltage, $V_{SY}$ to the anode of light emitting element $M_{12}$. At this time, voltage $G_1$, which is applied to row conductor $X_1$, and thus to the cathode of light-emitting element $M_{12}$ (as well as to the cathode of light emitting element $M_{11}$) is provided with a conditioning pulse of amplitude $-V_{SX}$, as shown in FIG. 17J. Consequently, the anode-cathode voltage across light emitting element $M_{12}$ is equal to the voltage provided at junction $J_2$ minus the voltage $G_1$ which is provided at row conductor $X_1$. As shown in FIG. 17L, this anode-cathode voltage is equal to $V_{SY} + V_{SX} = V_S$. Voltage $V_S$ exceeds the firing voltage of light emitting element $M_{12}$ so as to discharge this light emitting element. It is recalled that during the start pulse interval, and in response to the first recirculating pulse $P_D$, light element $M_{11}$ also is discharged, as shown by the waveform of FIG. 16K, reproduced herein as FIG. 17K. FIGS. 17M and 17N illustrate the commencement of the discharge duration of light elements $M_{11}$ and $M_{12}$, which emit light having discharge durations $L_{11}$ and $L_{12}$, respectively.

Thus, during the start pulse interval, it is seen that all of the light emitting elements disposed in row 1, that is, light emitting elements $M_{11}$, $M_{12}$, ... $M_{1n}$, are discharged simultaneously. Although not shown herein, it should be understood that, in response to the next recirculating pulse $P_D$ during the start pulse interval, all of the light emitting elements which are disposed in row 2, such as light emitting elements $M_{21}$, $M_{22}$, ... $M_{2n}$, are discharged simultaneously. Then, in response to the next following recirculating pulse, all of the light emitting elements disposed in the third row are discharged simultaneously, and so on, and on a row-by-row basis. At the end of the start pulse interval, it is expected that substantially all of the light emitting elements disposed in the X-Y array will be discharged.

At the completion of the start pulse interval, reference signal $E_V$ is increased to its next higher step level, as shown in FIGS. 17D and 17G. In accordance with the previously described example, it is assumed once again that sample 1 in line 1 (FIG. 17D) is greater than the step level of reference signal $E_V$ and, therefore, the discharge condition of light emitting element $M_{11}$ is sustained. It also is assumed that sample 2 in line 1 is less than the step level of the reference signal $E_V$, as shown in FIG. 17G. As is understood, since the level of sample 2 in line 1 is less than the step level, transistor 802 in column driving circuit $A_2$ is turned ON so as to supply the discharge voltage $V_{DY}$ to junction $J_2$ of column conductor $Y_2$, shown in FIG. 17I. At the time that sample 2 of line 1 is compared to the reference signal $E_V$, voltage $G_1$, which is applied to row conductor $X_1$, is provided with the disabling pulse of amplitude $V_{DX}$, as shown in FIG. 17J. Therefore, the anode-cathode voltage across light emitting element $M_{12}$ is equal to $V_{DY} - V_{DX} = V_D$. This anode-cathode voltage is less than the extinguishing voltage and, therefore, light emitting element $M_{12}$ is discharged.

Even though light emitting element $M_{12}$ is discharged, as also represented by the termination of the discharge duration $L_{12}$ in FIG. 17N, light emitting element $M_{11}$ is sustained in its discharge condition. This also is represented by the continuation of the discharge duration $L_{11}$ in FIG. 17M.

At the next cycle wherein sample 1 of line 1 is compared to the now-increased step level of reference signal $E_V$, the level of sample 1 in line 1 is seen to be less than the step level. Hence, transistor 802 in column driving circuit $A_1$ is turned ON so as to supply the discharge voltage $V_{DY}$ to column conductor $Y_1$. Consequently, the anode-cathode voltage across light emitting element $M_{11}$ is equal to the difference between the voltage at junction $J_1$ and voltage $G_1$ which is applied to row conductor $X_1$. Thus, the anode-cathode voltage is seen to be equal to $V_{DY} - V_{DX} = V_D$. This anode-cathode voltage is less than the extinguishing voltage; and, therefore, light emitting element $M_{11}$ now is extinguished. This is represented by the termination of the discharge duration $L_{11}$ of FIG. 17M.

In view of the foregoing description, it now should be appreciated that the light emitting element disposed in a particular column is not affected by the operation of any other light emitting elements in that same column. This is because the maximum and minimum voltages which are applied to an anode are not sufficient to discharge or extinguish the light emitting element in the absence of a conditioning or disabling pulse at the cathode thereof. Similarly, the operation of a light emitting element in a row is not affected by the operation of any other light emitting elements in that row. Therefore, there is no deleterious or undesired interference between the selective discharging and extinguishing of the light emitting elements of panel 100.

Another embodiment of the present invention now will be described with respect to FIGS. 18 and 19. In the aforedescribed embodiment, the staircase waveform of reference signal $E_V$ is progressively increasing in amplitude over a vertical interval. In the now-described embodiment, the staircase waveform of the reference signal progressively decreases from a maximum step level to a minimum step level of the vertical interval.

FIG. 18 illustrates a construction of row driving circuit 700 which can be used with this alternative embodiment. It is seen that this row driving circuit is substantially identical to the row driving circuit shown in FIG. 12, except that, instead of supplying the start pulse $S_T$ thereto, a reset pulse $S_R$ is supplied. Furthermore, and as will be explained, pulses $B_1-B_4$ are disabling pulses, while pulses $D_1-D_4$ are conditioning pulses.

Figure 19:
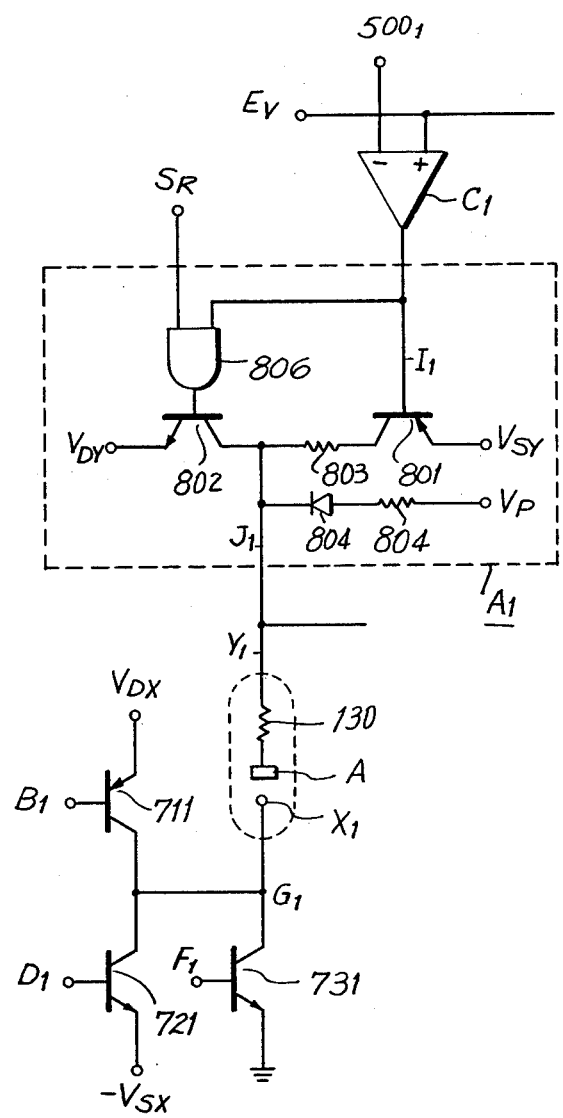
FIG. 19 is a schematic diagram of another embodiment of column-driving circuitry for the X-Y array which can be used with the present invention.

FIG. 19 is a schematic illustration of a column driving circuit $A_1$ which can be used with this alternative embodiment. This column driving circuit is similar to aforedescribed column driving circuit $A_1$ in FIG. 13, except that transistor 801 now is driven by comparator circuit $C_1$, and transistor 802 is driven by an AND gate 806 having one input connected to receive the reset pulse $S_R$ and another input connected to receive the output of comparator circuit $C_1$.

Although the row driving circuit shown in FIG. 18 and the column driving circuit shown in FIG. 19 are used in the alternative embodiment, sample-and-hold circuit 200, write-in memory circuit 300, switching circuit 400 and read-out memory circuit 500, as shown in FIG. 11, still can be employed. Thus, the operation of the circuit in this alternative embodiment is as shown by the waveforms illustrated in FIGS. 20A-20H which are similar to the aforedescribed waveforms shown in FIGS. 14A-14H, except that the reference signal $E_V$ shown in FIG. 20B is a staircase waveform of progressively decreasing steps; and FIG. 20H illustrates the periodic reset pulse $S_R$, rather than the periodic start pulse $S_T$. In the interest of brevity, the operation of the circuitry shown in FIG. 11, and depicted by the waveform diagrams shown in FIGS. 20A-20H, will not be repeated for this alternative embodiment. It should be understood that the operation of the circuitry shown in FIG. 11 in conjunction with this alternative embodiment is substantially the same as the operation thereof which has been described in detail above. Suffice it to say that each line of incoming video signals is sampled by sampling pulses $P_A$, and n sampled picture elements are stored on respective capacitors of sample-and-hold circuit 200. Each line of sampled picture elements is transferred into write-in memory circuit 300 in response to transfer pulses $P_B$, and as each line of sampled picture elements is transferred therein, the lines of picture elements which already are stored on respective rows of capacitors are shifted upward by one row in response to write/transfer pulse $P_{C1}$. Once a vertical interval has been fully sampled, the m lines of sampled picture elements which then are stored in write-in memory circuit 300 are transferred sequentially on a row-by-row basis through switching circuit 400, in response to write/transfer pulses $P_{C2}$, into read-out memory circuit 500 in response to recirculating pulses $P_D$. Then, after all of the sampled picture elements have been stored in the read-out memory circuit, each line of sampled picture elements is compared in comparator circuits $C_1 \ldots C_n$ to the then-existing step level of reference signal $E_V$, sequentially by row, in response to recirculating pulses $P_D$.

The primary difference between this alternative embodiment and the aforedescribed embodiment is that substantially all of the light emitting elements in panel 100 are extinguished during the reset pulse interval, and selected light emitting elements are discharged at particular times during a vertical interval, depending upon the brightness level of the corresponding sampled picture element; whereas in the previously described embodiment, substantially all of the light emitting elements are discharged at the beginning portion of the vertical interval, and these light emitting elements are selectively extinguished at a time during the vertical interval which is determined by the brightness level of the corresponding sampled picture element.

The operation of the row driving circuit shown in FIG. 18 now will be described with reference to the waveform diagrams illustrated in FIGS. 21A-21Z. FIG. 21A illustrates the staircase waveform of progressively decreasing steps, which constitutes the reference signal $E_V$. FIG. 21B illustrates the successive recirculating pulses $P_D$ wherein m recirculating pulses are generates during each step interval. Here again, in the interest of simplification, it is assumed that m=4. FIG. 21C illustrates the reset pulse $S_R$ which is generated following the completion of a preceding vertical interval and which extends for a duration equal to a step interval. The reset pulse $S_R$ is seen to be periodic, having a period equal to the vertical interval.

Disabling pulses $N_A$ are produced by AND gate 741, these disabling pulses being coincident with the recirculating pulses $P_D$ during the reset pulse interval. Successive ones of these disabling pulses are produced at the outputs of shift register 742, in sequence. Inverters 751-754 invert these sequential pulses to produce the sequential disabling pulses $B_1-B_4$, shown in FIGS. 21E-21H.

Inverter 743 supplies an inverted version $\overline{S_R}$ to AND gate 744, thereby enabling this AND gate to supply conditioning pulses $N_B$ to shift register 745. It is appreciated that these conditioning pulses $N_B$ are coincident with the recirculating pulses $P_D$ during the positive interval of the inverted reset pulse $\overline{S_R}$. Shift register 745 produces sequential conditioning pulses $D_1-D_4$ at its outputs, these conditioning pulses being recycled at each step interval, as shown in FIGS. 21K-21N. The conditioning pulses are inverted by inverters 761-764 and supplied as pulses $\overline{D_1}-\overline{D_4}$ (FIGS. 21O-21R) to AND gates 771-774, respectively. These AND gates also are supplied with disabling pulses $B_1-B_4$ (FIGS. 21E-21H) to produce periodic, sequential negative-going pulses $F_1-F_4$, as shown in FIGS. 21S-21V. One cycle of these sequential pulses $F_1$–$F_4$ is generated during each step interval of reference signal $E_V$.

It is seen that pulses $F_1$–$F_4$ normally exhibit a relatively high level so as to render transistors 731–734 normally conductive. This means that a ground potential, such as a zero voltage level, normally is supplied to row conductors $X_1$–$X_4$, as represented by voltages $G_1$–$G_4$ in FIGS. 21W–21Z, respectively. During the reset pulse interval, when pulses $F_1$–$F_4$ undergo their negative transitions to turn OFF transistors 731–734, disabling pulses $B_1$–$B_4$ turn ON transistors 711–714, in sequence, to supply disabling voltage pulses of amplitude $V_{DX}$ to row conductors $X_1$–$X_4$, as shown in FIGS. 21W–21Z. During the remainder of the vertical interval, that is, between successive reset pulses, when the negative transitions of pulses $F_1$–$F_4$ turn OFF transistors 731–734, conditioning pulses $D_1$–$D_4$ turn ON transistors 721–724, respectively, to provide output voltages $G_1$–$G_4$ with conditioning pulses of amplitude $-V_{SX}$ at row conductors $X_1$–$X_4$, as shown in FIGS. 21W–21Z, respectively.

Thus, each row conductor, such as row conductor $X_1$, is provided with a disabling pulse following the completion of a vertical interval, that is, during the reset pulse interval, and is provided with a conditioning pulse once during each successive step interval following the reset pulse interval. The period between successive disabling pulses provided at a row conductor, such as row conductor $X_1$, is seen to be equal to $T_1$, which is equal to the vertical interval. Because of the sequential production of these disabling pulses, voltages $G_1$–$G_4$ are seen to be offset from each other with respect to time.

The manner in which a light emitting element is controlled by the row driving circuit shown in FIG. 18 and the column driving circuit shown in FIG. 19 now will be explained in conjunction with the waveform diagrams illustrated in FIGS. 22A–22R. It will be recognized that the waveform diagrams of FIGS. 22A–22R represent substantially the same signals as the waveforms of FIGS. 16A–16R, except that FIG. 22C depicts the reset pulse $S_R$, rather than the start pulse $S_T$, and the reference signal $E_V$ in FIG. 22D is illustrated as being a progressively decreasing staircase waveform, rather than the progressively increasing staircase waveform shown in FIG. 16D.

Consistent with the previously described embodiment, it is here assumed that the first sampled picture element of the first line of video signals is represented as sample No. 1, the first sampled picture element in the second line of video signals is represented as sample No. 2, the first sampled picture element in the third line of video signals is represented as sample No. 3, and the first sampled picture element of the m-th line of video signals is represented as sample No. 4 (wherein m=4). Thus, samples 1, 2, 3 and 4 are stored on capacitors 511, 521, 531 and 541 of read-out memory circuit 500 (FIG. 11).

The reset pulse $S_R$ is produced following the completion of a vertical interval in the incoming video signal. In response to the first recirculating pulse $P_D$, sample No. 1 is read out of capacitor 511 and compared in comparator circuit $C_1$ to the maximum step level of reference signal $E_V$. At the same time, voltage $G_1$ is provided with a disabling pulse of amplitude $V_{DX}$, redrawn herein as FIG. 22G. Since sample No. 1 is less than the step level of reference signal $E_V$, transistor 801 in column driving circuit $A_1$ is turned OFF, and AND gate 806 is enabled so as to turn ON transistor 802. Consequently, the extinguishing voltage $V_{DY}$ is supplied to junction $J_1$. Therefore, the anode-cathode voltage across light emitting element $M_{11}$ is equal to the difference between the voltage at the junction $J_1$ and voltage $G_1$. This anode-cathode voltage is equal to $V_{DY}-V_{DX}=V_D$. It is recalled that voltage $V_D$ is less than the extinguishing voltage and, if light emitting element $M_{11}$ had been discharged, it now is extinguished, as represented by the "x" adjacent the negative-going pulse shown in FIG. 22K.

In response to the next recirculating pulse $P_D$, sample 2 is shifted to capacitor 511, and voltage $G_2$ is provided with a disabling pulse of amplitude $V_{DX}$ (FIG. 22H). Since sample No. 2 is less than the step level of the reference signal, transistor 801 is turned OFF, and AND gate 806 is enabled to turn ON transistor 802. This supplies the extinguishing voltage $V_{DY}$ to junction $J_1$. Hence, the anode-cathode voltage across light emitting element $M_{21}$ is equal to $V_{DY}-V_{DX}=V_D$. Therefore, if light emitting element $M_{21}$ had been discharged, it now is extinguished.

In response to the next recirculating pulse $P_D$, sample No. 3 is shifted to capacitor 511 and voltage $G_3$ is provided with the disabling pulse. Since sample No. 3 is assumed to be less than the step level of the reference signal, transistor 801 is turned OFF and AND gate 806 is enabled to turn ON transistor 802. This supplies the extinguishing voltage $V_{DY}$ to junction $J_1$, and thus to the anode of light emitting element $M_{31}$. The anode-cathode voltage across this light emitting element is seen to be equal to $V_D$, whereby this light emitting element, if it had been discharged, now is extinguished.

In response to the next recirculating pulse $P_D$, sample No. 4 is shifted to capacitor 511 and voltage $G_4$ is provided with the disabling pulse. It is here assumed that the level of sample No. 4 corresponds to the peak white level and, therefore, is greater than the step level of reference signal $E_V$. It is further assumed that, during the preceding vertical interval, light emitting element $M_{41}$, which is driven as a function of the brightness level of sample No. 4, had been discharged. Now, since sample No. 4 exceeds the step level of reference signal $E_V$, AND gate 806 is disabled so as to turn OFF transistor 802. Transistor 801 now is turned ON to supply the voltage $V_{SY}$ to junction $J_1$, and thus to the anode of light emitting element $M_{41}$. The cathode voltage $G_4$ of light emitting element $M_{41}$ is equal to the disable pulse amplitude $V_{DX}$, the anode-cathode voltage across light emitting element $M_{41}$ is equal to $V_{SY}-V_{DX}$. It is recalled that this voltage is greater than the extinguishing voltage and, therefore, light emitting element $M_{41}$ is sustained in its discharge condition. Of course, if sample No. 4 had been less than the peak white level, light emitting element $M_{41}$ would have been extinguished. Alternatively, if the maximum step level of reference signal $E_V$ had been greater than the peak white level, this light emitting element would have been extinguished.

In accordance with the assumed example, FIGS. 22O–22Q represent the termination of the discharge durations $L_{11}$, $L_{21}$ and $L_{31}$, respectively. FIG. 22R represents that the discharge duration $L_{41}$ continues.

At the completion of the reset pulse, which is assumed to be equal to the step interval, reference signal $E_V$ is reduced to its next lower level. In response to the next recirculating pulse $P_D$, sample No. 1 is shifted to capacitor 511, and voltage $G_1$ is provided with a conditioning pulse of amplitude $-V_{SX}$. As shown in FIG. 22D, it is assumed that the level of sample No. 1 is less than the step level of reference signal $E_V$. Hence, transistor 801 is not turned ON. Furthermore, since the reset pulse $S_R$ has terminated, AND gate 806 remains disabled, and transistor 802 likewise is not turned ON. Therefore, diode 804 supplies the quiescent voltage $V_P$ to junction $J_1$, and thus to the anode of light emitting element $M_{11}$. The anode-cathode voltage, which is equal to $V_P+V_{SX}$, is less than the discharge, or initializing voltage, and light emitting element $M_{11}$ remains in its extinguished condition.

In response to the next recirculating pulse $P_D$, sample No. 2 is shifted to capacitor 511 and voltage $G_2$ is provided with the conditioning pulse of amplitude $-V_{SX}$. As shown in FIG. 22D, it is assumed that the level of sample No. 2 exceeds the step level of reference signal $E_V$. Hence, output $I_1$ of comparator circuit $C_1$ is at a relatively low level so as to turn ON transistor 801. This supplies a discharge voltage $V_{SY}$ to junction $J_1$, and to the anode of light emitting element $M_{21}$. Accordingly, the anode-cathode voltage across light emitting element $M_{21}$ now is equal to $V_{SY}+V_{SX}=V_S$. This voltage is greater than the firing voltage of the light emitting element and, therefore, light emitting element $M_{21}$ is discharged. This condition is represented by the "o" adjacent the positive-going pulse in FIG. 22L. When voltage $G_2$ returns to its zero level, the anode-cathode voltage across light emitting element $M_{21}$ is equal to $V_{SY}$. This is greater than the extinguishing voltage and, therefore, this light emitting element is sustained in its discharge condition. FIG. 22B represents the commencement of the discharge duration $L_{21}$ of light emitting element $M_{21}$.

In response to the next recirculating pulse $P_D$, sample No. 3 is shifted to capacitor 511 and voltage $G_3$ is provided with the conditioning pulse. However, since the level of sample No. 3 is assumed to be less than the step level of reference signal $E_V$, only the quiescent voltage $V_P$ is supplied to junction $J_1$, and thus to the anode of light emitting element $M_{31}$. The anode-cathode voltage, which is equal to $V_P+V_{SX}$, is less than the firing voltage and is not sufficient to discharge this light emitting element. Hence, light emitting element $M_{31}$ remains in its extinguished condition.

In response to the next recirculating pulse $P_D$, sample No. 4 is shifted to capacitor 511. Since this sample still exceeds the step level of reference signal $E_V$, the corresponding light emitting element $M_{41}$ remains in its discharge condition.

After sample No. 4 (the m-th sample) is shifted to capacitor 511, the staircase waveform of reference signal $E_V$ is reduced to its next lower level. The foregoing operation then is repeated, whereby sample Nos. 1, 2, 3 and 4 are compared, in sequence, to the step level of reference signal $E_V$, in synchronism with the application of sequential conditioning pulses to row electrodes $X_1$–$X_4$. Whenever the level of a compared sample exceeds the step level, voltage $V_{SY}$ is supplied to junction $J_1$ of column conductor $Y_1$, and thus to all of the anodes of the light emitting elements included in that column. On the other hand, if the level of a compared sample is less than the step level of the reference signal $E_V$, then transistor 801 is turned OFF, and the quiescent voltage $V_P$ is supplied to junction $J_1$, and thus to the anodes of all of the light emitting elements which are connected to column conductor $Y_1$. The combination of an anode voltage $V_{SY}$ and a cathode voltage $-V_{SX}$ is sufficient to discharge a light emitting element which previously had been in its extinguished condition. Of course, if the light emitting element previously had been in its discharged condition, it remains therein.

Whenever the quiescent voltage $V_P$ is applied to the anode of a light emitting element, that element remains in its previously assumed condition, either discharged or extinguished, regardless of whether its cathode is supplied with a conditioning pulse, a disabling pulse or a zero voltage level.

Thus, during the first lower level of reference signal $E_V$, light emitting element $M_{21}$, which is associated with sample No. 2, is discharged when voltage $G_2$ is provided with the conditioning pulse. Light emitting element $M_{21}$ is sustained in its discharge condition until the next reset pulse $S_R$ is produced. This discharge duration of light element $M_{21}$ is shown as waveform $L_{21}$ in FIG. 22P.

Similarly, light-emitting element $M_{31}$ is not discharged until reference signal $E_V$ is reduced to its third step level. At that time, light emitting element $M_{31}$ is discharged when voltage $G_3$ is provided with the conditioning pulse. Furthermore, light emitting element $M_{31}$ is sustained in its discharge condition until the occurrence of the next reset pulse. This discharge duration of light emitting element $M_{31}$ is shown as waveform $L_{31}$ in FIG. 22Q.

Light emitting element $M_{11}$ is not discharged until reference signal $E_V$ is reduced to its fourth lower step level. At that time, light emitting element $M_{11}$ is discharged when voltage $G_1$ is provided with the conditioning pulse. As shown in FIG. 22O, the discharge duration $L_{11}$ of light emitting element $M_{11}$ is maintained until the occurrence of the next reset pulse.

Upon the occurrence of the next reset pulse, that is, the right-most reset pulse $S_R$ shown in FIG. 22C, it has been assumed that sample No. 1 now is increased to the peak white level, and that sample No. 4 is reduced to a lower level. These samples, of course, are the first sampled picture elements in lines 1 and 4 of the next vertical interval of incoming video signals. Since the level of sample No. 1 corresponds to the peak white level, and thus exceeds the step level of reference signal $E_V$, light emitting element $M_{11}$ is not extinguished. Thus, as shown in FIG. 22O, the discharge duration $L_{11}$ continues.

Since sample No. 4 now is assumed to be less than the peak white level, and thus less the maximum step level of reference signal $E_V$, its corresponding light emitting element $M_{41}$ is discharged during the reset pulse interval, as shown by the termination of the discharge duration $L_{41}$ of FIG. 22R.

In FIG. 22K and FIG. 22N, the "Δ" shown therein represents that the light emitting element is not extinguished during the reset pulse interval because the level of the corresponding sample is greater than the peak white level. This means that, when a sample is greater than the peak white level, and thus exceeds the maximum step level of reference level $E_V$, the corresponding light emitting element is sustained in its discharge duration for an entire vertical interval.

The foregoing description has explained the operation of a column of light emitting elements. It is appreciated that the remaining columns of light emitting elements are operated in a similar manner. Furthermore, all of the light emitting elements which are disposed in a common row, such as row 1, are selectively operated simultaneously when row conductor $X_1$ is provided either with a disabling pulse or with a conditioning pulse. That is, light emitting elements $M_{11}$, $M_{12}$, ... $M_{1n}$ are selectively discharged or extinguished, in parallel, in accordance with the levels of their corresponding sampled picture elements. Then, in response to the next recirculating pulse $P_D$, light emitting elements $M_{21}$, $M_{22}$, ... $M_{2n}$ are selectively extinguished or discharged, in parallel. This selective control over the remaining light emitting elements continues on a row-by-row basis during each step interval of the reference signal $E_V$. A complete cycle is completed at the end of the step interval and is resumed at the beginning of the next following step interval.

In the foregoing description, it has been assumed that even if the level of a sampled picture element is equal to the black level, its corresponding light emitting element will be discharged for a minimum duration, here assumed to be equal to the step interval. Also, it has been assumed that if the level of a sampled picture element is equal to the peak white level, then the light emitting element corresponding thereto will not be extinguished. However, it is contemplated, in yet another alternative embodiment, a light emitting element will not be discharged if the level of its corresponding picture element is equal to the black level. Also, the maximum step level of the reference signal may be greater than the peak white level, so that a light emitting element is discharged at the end of a vertical interval even if the level of its corresponding picture element is equal to the white peak level. These alternative embodiments are applicable either for a video display system wherein the reference signal $E_V$ is a staircase waveform of progressively increasing or decreasing steps. Thus, in either embodiment, if the level of a sampled picture element is greater than the black level, then its corresponding light emitting element will be discharged for a duration determined by that level, but, in any event, will be less than a vertical interval.

Figure 23:
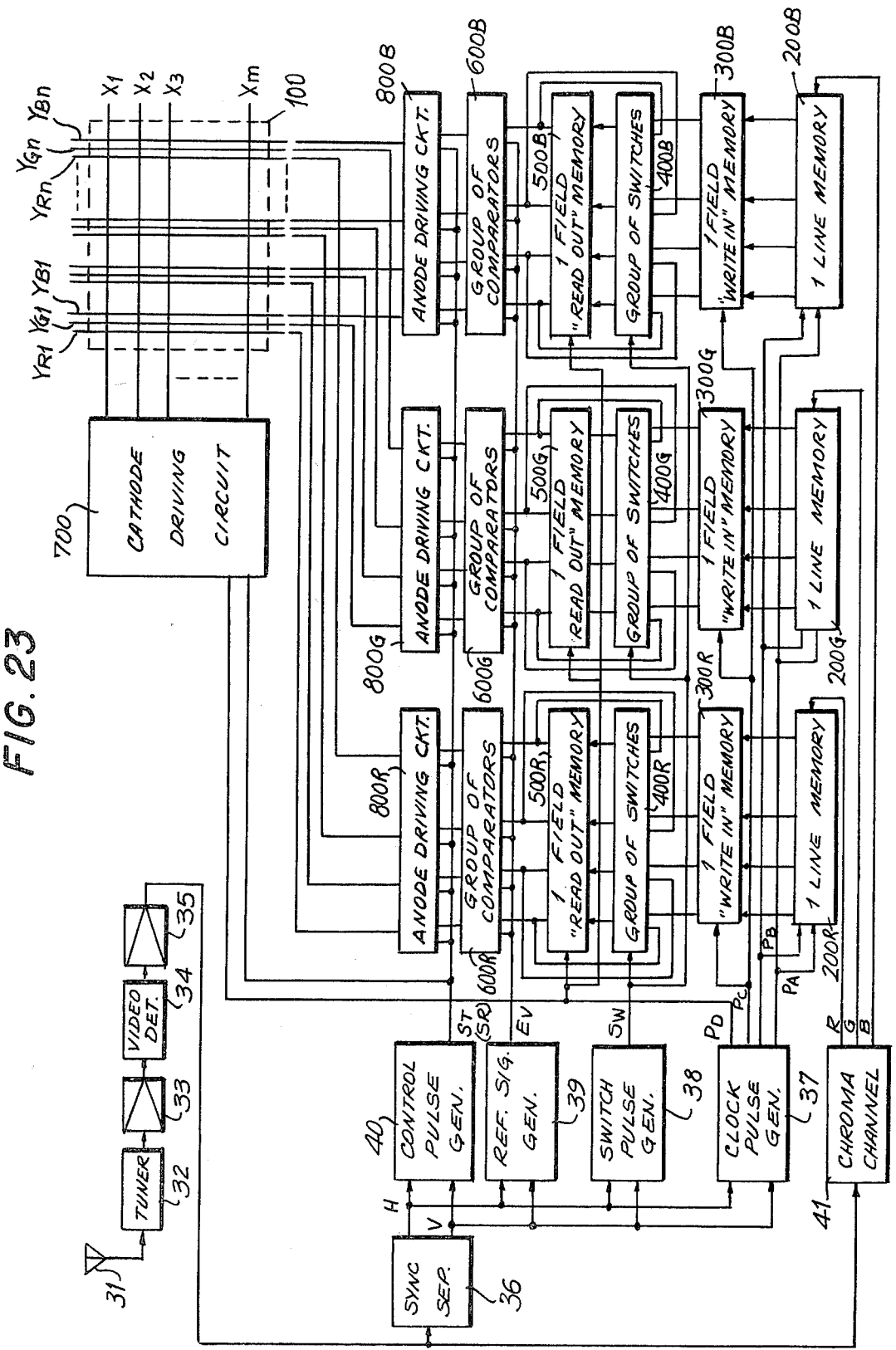
FIG. 23 is a block diagram of another embodiment of the present invention wherein an X-Y array of light emitting elements can be used to display a color video picture.

In the aforedescribed embodiments, it is assumed that the incoming video signal is a monochrome (black and white) video signal. However, the present invention is equally applicable to a conventional composite color television signal. FIG. 23 is a block diagram of one embodiment of a video display system for such a composite color television signal.

The block diagram of FIG. 23 is seen to be substantially similar to the aforedescribed block diagram of FIG. 7, except that each column conductor $Y_1 ... Y_n$ is constituted by three column leads $Y_{R1}$, $Y_{G1}$, $Y_{B1}$, and so on. These three column leads correspond to red, green and blue light emitting elements. For example, the light emitting element which emits red light is provided at the intersection of row conductor $X_1$ and column leads $Y_{R1}, Y_{R2}, ... Y_{Rn}$. A light emitting element which emits green light is provided at the intersections of row conductor $X_1$ and each of column leads $Y_{G1}, Y_{G2}, ... Y_{Gn}$. Finally, a light emitting element which emits blue light is provided at the intersections of each of row conductor $X_1$ and column leads $Y_{B1}, Y_{B2}, ... Y_{Bn}$. The column leads of each color, for example, column leads $Y_{R1} ... Y_{Rn}$ are driven by a corresponding column driving circuit 800R. Also, column leads $Y_{G1}, ... Y_{Gn}$ are driven by column driving circuit 800G. Finally, column leads $Y_{B1} ... Y_{Bn}$ are driven by column driving circuit 800B. Each column driving circuit is controlled by a separate set of sample-and-hold circuits, write-in memory circuits, switching circuits, read-out memory circuits and comparator circuits. For example, sample-and-hold circuit 200R is adapted to sample the red color video signals which are included in the incoming composite color television signal. Similarly, sample-and-hold circuit 200G is adapted to sample the green color video signals included in the incoming composite color television signal. Finally, sample-and-hold circuit 200B is adapted to sample the blue color video signal included in the incoming composite color television signal. Thus, each of sample-and-hold circuits 200R, 200G and 200B may be similar to aforedescribed sample-and-hold circuit 200.

Similarly, write-in memory circuits 300R, 300G and 300B each may be similar to aforedescribed write-in memory circuit 300, and each is adapted to store a vertical interval of sampled picture elements which are obtained from the corresponding color video signal which is supplied to the sample-and-hold circuit connected thereto. Switching circuits 400R, 400G and 400B each may be similar to aforedescribed switching circuit 400, and each is adapted to selectively connect the output of its associated write-in memory circuit 300R, 300G and 300B to the input of its associated read-out memory circuit 500R, 500G and 500B, respectively. Each of these read-out memory circuits may be similar to aforedescribed read-out memory circuit 500, and each is adapted to store a vertical interval of sampled picture elements which have been obtained from a corresponding color video signal. Thus, read-out memory circuit 500R stores the sampled picture elements which are obtained from the red color video signal; read-out memory circuit 500G is adapted to store the sampled picture elements which are obtained from the green video signal; and read-out memory circuit 500B is adapted to store the sampled picture elements which are obtained from the blue color video signal.

The contents of each of the read-out memory circuits are recirculated therethrough under the control of switching circuits 400R, 400G and 400B, respectively. Furthermore, each line of sampled picture elements is read out from each of the read-out memory circuits on a row-by-row basis, and the read out sampled picture elements are compared to the reference signal $E_V$ in comparator circuits 600R, 600G and 600B, respectively. The outputs from these comparator circuits are supplied to column driving circuits 800R, 800G and 800B.

In FIG. 7, the video signal $S_V$ from video amplifier 5 is supplied to sample-and-hold circuit 200. In FIG. 23, the composite video signal from video amplifier 5 is demodulated by chrominance demodulator 41 into its respective red, green and blue color video signals. These demodulated color video signals are supplied to sample-and-hold circuits 200R, 200G and 200B, respectively.

It may be appreciated that each of the sample-and-hold circuits, write-in memory circuits, switching circuits, read-out memory circuits, comparator circuits and column driving circuits can be operated in parallel. Thus, a common clock pulse generator 37, a common switch pulse generator 38, a common reference signal generator 39 and a common control pulse generator 40 can be provided, each of these generators being coupled to synchronizing signal separator circuit 36 to receive the separated horizontal and vertical synchronizing pulses.

Row driving circuit 700 in FIG. 23 may be of similar construction to the row driving circuits shown in FIGS. 12 and 18, as desired. It is appreciated that the cathodes of each of the red, green and blue light emitting elements in a row are driven simultaneously. Of course, the determination as to whether the respective light emitting elements in a row are discharged or extinguished is a function of the level of the sampled red, green and blue picture elements corresponding thereto.

Panel 100, which may be provided with the red, green and blue light emitting elements, may have a construction similar to that shown in FIGS. 8 and 9, except that each anode A is constructed as three separate anodes $A_R$, $A_G$ and $A_B$, each being surrounded by fluorescent material which emits red, green and blue light, respectively.

The operation of each set of sample-and-hold circuits, write-in memory circuits, switching circuits, read-out memory circuits, comparator circuits and column driving circuits shown in FIG. 23 is substantially identical to the aforedescribed operation which has been explained with reference to a monochrome video signal. Accordingly, in the interest of brevity, and in order to avoid unnecessary repetition, further description of the embodiment shown in FIG. 23 is not provided.

A typical, practical embodiment of the invention described herein is comprised of two hundred rows of conductors (m=200), two hundred eighty columns of conductors (n=280) and one hundred twenty-eight step levels (w=128). This would mean that two hundred lines of video signals are sampled during each field interval, each line being represented by two hundred eighty sampled picture elements. Furthermore, reference signal $E_V$ will be provided with one hundred twenty-eight discrete step levels. Also, in a practical embodiment, each step interval may be equal to two line intervals. This would mean that one hundred separate step levels are provided during the useful portion of the video signal, i.e., the two hundred line intervals, and twenty-eight step levels are provided during the effective vertical blanking interval. Of course, if desired, a greater number of rows of conductors may be provided so as to display a greater number of lines of video signals. Similarly, a greater number of columns of conductors may be provided, so as to accommodate a greater number of sampled picture elements in each line interval. Also, each step interval may, if desired, be equal to a horizontal line interval. Since the number of step levels of the reference signal $E_V$ determines the number of discrete brightness levels which can be displayed, it is appreciated that an increase in the step levels will result in an increase in the available brightness levels. However, it is believed that one hundred twenty-eight step levels is sufficient to provide an accurate video display of satisfactory resolution. Furthermore, although the staircase waveform which constitutes reference signal $E_V$ has been assumed to repeat at the field repetition rate, it is recognized that, if desired, the repetition rate of the staircase waveform can be equal to the frame repetition rate. The expression "vertical interval" thus is intended to mean a field interval or, if desired, a frame interval. Of course, if the staircase waveform repeats at the frame rate, the write-in and read-out memory circuits should have a storage capacity equal to a frame of picture elements.

It now should be appreciated that, in accordance with the present invention, an improved video display system is provided. This video display system affords desirably high brightness levels, yet the light emitting elements are operated with relatively high efficiency. Each light emitting element is excited, or discharged, for a duration greater than a line interval and less than a vertical interval as a function of the brightness of the sampled picture element when the level of that sampled picture element is between the black and peak white levels. The discharge duration of a light emitting element is seen to be much longer than that of the prior art wherein the maximum discharge duration is less than a line interval. Because of this extended discharge duration of a light emitting element in accordance with the present invention, the discharge current flowing through the light emitting element can be maintained at a low level. Even though the overall brightness level of the displayed video picture can be divided into a large number of discrete steps, such as one hundred twenty-eight steps, adjacent steps of brightness levels are distinguishable. Also, by reducing the requisite current levels to obtain the desired brightness levels of the light emitting elements, the lifetime of each light emitting element is prolonged. Since the cathode of a gas discharge device is spattered in an amount which is proportional to the square of the cubic value of the discharge current therethrough, this problem is significantly reduced by the present invention because of the relatively small current levels which are employed.

While the present invention has been particularly shown and described with reference to certain preferred embodiments thereof, it should be readily apparent to those of ordinary skill in the art that various changes and modifications in form and details can be made without departing from the spirit and scope of the invention. For example, the write-in and read-out memory circuits, although shown and described as analog devices, such as capacitive storage elements, alternatively may comprise digital memory devices for storing digitized samples of picture elements. It is intended that the appended claims be interpreted as including this as well as other changes and modifications which have been suggested above, as well as those which will become apparent to one of ordinary skill in the art.

What is claimed is:

1. A method of displaying a video picture on a matrix array of light emitting elements formed of m rows and n columns of said elements, comprising the steps of:
   receiving a video signal comprised of periodic vertical intervals each containing successive line intervals of video information;
   sampling said line intervals of video information and storing n sampled picture elements for each sampled line interval in a vertical interval; and
   energizing, during a vertical interval, a light emitting element corresponding to a sampled picture element in a respective line interval for a duration greater than a line interval and less than a vertical interval as a function of the brightness of said sampled picture element when said sampled picture element is between black and peak white levels.

2. The method of claim 1 wherein said step of energizing comprises energizing sequentially by line all of the light emitting elements in each line at the beginning portion of a vertical interval; and extinguishing a light emitting element at a later time during said vertical interval, said later time being more than a line interval and depending upon the brightness of the sampled picture element corresponding to said light emitting element.

3. The method of claim 2 wherein said step of energizing further comprises generating a reference voltage having a periodic staircase waveform of successively increasing amplitude during each vertical interval; comparing each sampled picture element to said reference voltage; energizing the light emitting element corresponding to a sampled picture element which exceeds said reference voltage; and extinguishing the energized light emitting element when said sampled picture element is less than said reference voltage.

4. The method of claim 3 wherein said step of energizing further comprises sequentially applying an enabling voltage to each of said m rows in said matrix array at said beginning portion of a vertical interval; sequentially applying a de-conditioning voltage to each of said m rows in said matrix array during each successive step interval of said reference voltage; energizing light emitting elements in a row when an enabling voltage is applied thereto, provided said light emitting elements correspond to sampled picture elements which exceed said reference voltage; and extinguishing light emitting elements in a row when a deconditioning voltage is applied thereto, provided said light emitting elements correspond to sampled picture elements which are less than said reference voltage.

5. The method of claim 1 wherein said step of energizing comprises energizing a light emitting element at a time during said vertical interval, which time is a function of the brightness of the sampled picture element corresponding to said light emitting element; and extinguishing sequentially by line all of said light emitting elements in each line following the completion of said vertical interval; whereby the duration that each light emitting element is energized during said vertical interval is greater than a line interval.

6. The method of claim 5 wherein said step of energizing further comprises generating a reference voltage having a periodic staircase waveform of successively decreasing amplitude during each vertical interval; comparing each sampled picture element to said reference voltage; energizing the light emitting element corresponding to a sampled picture element which exceeds said reference voltage; and extinguishing the energized light emitting element when said sampled picture element is less than said reference voltage.

7. The method of claim 6 wherein said step of energizing further comprises sequentially applying an enabling voltage to each of said m rows in said matrix array during each successive step interval of said reference voltage; sequentially applying a de-conditioning voltage to each of said m rows in said matrix array immediately following the completion of a vertical interval; energizing light emitting elements in a row when an enabling voltage is applied thereto, provided said light emitting elements correspond to sampled picture elements which exceed said reference voltage; and extinguishing light emitting elements in a row when a de-conditioning voltage is applied thereto, provided said light emitting elements correspond to sampled picture elements which are less than said reference voltage.

8. The method of claim 4 or 7 wherein said staircase waveform is comprised of step intervals, each having a duration equal to an integral number of line intervals.

9. Apparatus for displaying a video picture in response to a received video signal which is formed of periodic vertical intervals, each vertical interval containing successive line intervals of video information, said apparatus comprising:
a matrix array of light emitting elements, said matrix array having m rows of electrodes and n columns of electrodes, the electrodes at the intersection of a row and a column being included in a light emitting element;
sampling means for obtaining n samples of each of m line intervals in a vertical interval and for storing n sampled picture elements for each of the sampled line intervals;
row driving means for driving said m rows of electrodes;
column driving means for driving said n columns of electrodes;
means coupled to said sampling means for detecting the brightness level of each of said n sampled picture elements in each of said m line intervals; and
means for driving said column driving means in accordance with said detected brightness levels to cause the selective energization of said light emitting elements sequentially by row and repeatedly during a vertical interval, each energized light emitting element being energized for a duration that is a function of the brightness level of the sampled picture element associated therewith, which duration is greater than a line interval and less than a vertical interval if the brightness level of said associated sampled picture element is less than the peak white level and greater than the black level.

10. The apparatus of claim 9 wherein said means for detecting the brightness level of each sampled picture element comprises reference voltage generating means for generating a reference voltage having a staircase waveform during each vertical interval, the step interval of said staircase waveform being equal to at least one line interval; n comparator means for comparing the n sampled picture elements in a sampled line interval to said reference voltage during successive step intervals to detect if a sampled picture element exceeds said reference voltage; and means for shifting, sequentially by line, the n sampled picture elements in each of the remaining line intervals to said n comparator means during each step interval.

11. The apparatus of claim 10 wherein said row driving means comprises pulse generating means for generating m successive voltage pulses during each step interval of said staircase waveform, and means for applying each of said m voltage pulses to a respective one of said m rows of electrodes; whereby a light emitting element is selectively energized or extinguished in accordance with the voltage difference across its column electrode, as determined by said column driving means, and its row electrode, as determined by said pulse generating means.

12. The apparatus of claim 10 wherein said staircase waveform of said reference voltage is of successively increasing step levels; said row driving means comprises pulse generating means for generating m successive enabling pulses during the beginning portion of said vertical interval and for generating m successive deconditioning pulses during each remaining step interval in said vertical interval; and said means for driving said column driving means comprises means for supplying an initializing voltage to each of said n columns of electrodes during said beginning portion of said vertical interval, a quiescent voltage to those columns of electrodes during each remaining step interval in said vertical interval corresponding to those sampled picture elements which exceed said step level, and an extinguishing voltage to those columns of electrodes during each remaining step interval in said vertical interval corresponding to those sampled picture elements which are less than said step level; whereby a light emitting element at the intersection of a row and column is energized in response to the coincidence of an enabling pulse and said initializing voltage applied to its row and column electrodes, respectively, is maintained energized in response to said quiescent voltage applied to its column electrode, and is extinguished in response to the coincidence of a de-conditioning pulse and said extinguishing voltage applied to its row and column electrodes, respectively.

13. The apparatus of claim 12 further comprising timing means for generating a start pulse at said beginning portion of said vertical interval, and wherein said means for supplying an initializing voltage, a quiescent voltage and an extinguishing voltage comprises a source of initializing, quiescent and extinguishing voltages, and n switching circuits interconnected between said source and said n columns, respectively, each switching circuit comprising first switch means operative in response to said start pulse for switching said initializing voltage to said column, second switch means operative in response to a respective comparator means for switching said extinguishing voltage to said column when the sampled picture element applied to said respective comparator means is less than said step level, and means operative when said first and second switch means are not operative to supply said quiescent voltage to said column.

14. The apparatus of claim 13 wherein said timing means further generates timing pulses at a rate of m timing pulses during each step interval; and wherein said pulse generating means in said row driving means comprises gated shift register means responsive to said timing pulses and to said start pulse for generating a first set of m successive timing pulses during the start pulse duration and for generating a second set of timing pulses thereafter, and m tri-state switch means, each of said m tri-state switch means being responsive to a respective timing pulse during said start pulse duration to produce an enabling pulse of a first level, to a respective timing pulse following said start pulse duration to produce a de-conditioning pulse of a second level, and to the absence of a timing pulse to produce a constant, intermediate level.

15. The apparatus of claim 14 wherein each of said tri-state means comprises first switch means connected between a source of enabling voltage and an output terminal and energized in response to a respective one of said timing pulses during said start pulse duration; second switch means connected between a source of de-conditioning voltage and said output terminal and energized in response to respective ones of said timing pulses following said start pulse duration; and third switch means connected between a source of intermediate voltage and said output terminal, said third switch means being normally energized and being de-energized in response to the occurrence of a respective timing pulse.

16. The apparatus of claim 10 wherein said staircase waveform of said reference voltage is of successively decreasing step levels; said row driving means comprises pulse generating means for generating m successive de-conditioning pulses following a vertical interval and for generating m successive enabling pulses during each step interval in said vertical interval; and said means for driving said column driving means comprises means for supplying an initializing voltage to those columns of electrodes during each step interval in said vertical interval corresponding to those sampled picture elements which exceed said step level and an extinguishing voltage to those columns of electrodes during the step interval of a high step level following a vertical interval corresponding to those sampled picture elements which are less than said high step level; whereby a light emitting element at the intersection of a row and column is energized in response to the coincidence of an enabling pulse and said initializing voltage applied to its row and column electrodes, respectively, and is extinguished in response to the coincidence of a de-conditioning pulse and said extinguishing voltage applied to its row and column electrodes, respectively.

17. The apparatus of claim 16 further comprising timing means for generating a reset pulse following a vertical interval when said step level is high; and wherein said means for supplying initializing and extinguishing voltages comprises a source of initializing, quiescent and extinguishing voltages, and n switching circuits interconnected between said source and said n columns, respectively, each switching circuit comprising first switch means operative in response to a respective comparator means for switching said initializing voltage to said column when the sampled picture element applied to said respective comparator means exceeds said step level, second switch means operative in response to said reset pulse for switching said extinguishing voltage to said column if said sampled picture element applied to said respective comparator means is less than said step level, and means operative when said first and second switch means are not operative to supply said quiescent voltage to said column.

18. The apparatus of claim 17 wherein said timing means further generates timing pulses at a rate of m timing pulses during each step interval; and wherein said pulse generating means in said row driving means comprises gated shift register means responsive to said timing pulses and to said reset pulse for generating a set of m successive timing pulses during the reset pulse duration and for generating another set of timing pulses between successive reset pulses, and m tri-state switch means, each of said m tri-state switch means being responsive to a respective timing pulse during said reset pulse duration to produce a de-conditioning pulse of a first level, to a respective timing pulse between successive reset pulses to produce an enabling pulse of a second level, and to the absence of a timing pulse to produce a constant, intermediate level.

19. The apparatus of claim 18 wherein each of said tri-state means comprises first switch means connected between a source of de-conditioning voltage and an output terminal and energized in response to a respective one of said timing pulses during said reset pulse duration; second switch means connected between a source of enabling voltage and said output terminal and energized in response to respective ones of said timing pulses between successive reset pulses; and third switch means connected between a source of intermediate voltage and said output terminal, said third switch means being normally energized and being de-energized in response to the occurrence of a respective timing pulse.

20. The apparatus of claim 10 wherein said sampling means comprises n sampling circuits responsive to n sampling pulses during each line interval for sampling said video signal to obtain n respective sampled picture elements; write-in memory means having m rows of n storage means in each row, the m-th row of said write-in memory means being coupled to said n sampling circuits and responsive to a transfer pulse at the end of each line interval for shifting the n sampled picture elements from said sampling circuits into said m-th row and for shifting the n sampled picture elements from a preceding row to the next adjacent row; and read-out memory means having m rows of n storage means in each row, the m-th row of said read-out memory means being coupled to the first row of said write-in memory means and responsive to shift pulses for shifting the sampled picture elements from said write-in memory means into said read-out memory means, said read-out memory means further including recirculating means for recirculating the contents thereof during each step interval of said reference voltage.

21. The apparatus of claim 20, further comprising a clock generator for generating said sampling pulses at the rate of n sampling pulses during each line interval, for generating transfer pulses at the rate of one transfer pulse during each line interval and m transfer pulses during the vertical blanking period of said video signal, and for generating shift pulses at the rate of m shift pulses during each step interval.

22. The apparatus of claim 21 further comprising transfer switch means coupled between said write-in and said read-out memory means, said transfer switch means including n switching circuits energized during said vertical blanking period for a duration sufficient to transfer all of the sampled picture elements from said write-in memory means to said read-out memory means, and said n switching circuits being de-energized to establish a recirculating path from the first row of said read-out memory means to the m-th row thereof.

23. The apparatus of claim 22 wherein the first row of said read-out memory means is coupled to said comparator means; and wherein said shift pulses are supplied to said row driving means, whereby successive rows are driven sequentially and in synchronism with the row-by-row shifting of sampled picture elements in said read-out memory means.

24. The apparatus of claim 9 wherein said video signal is a color video signal and wherein each column of electrodes is comprised of plural columns, each of said plural columns being associated with a respective color component; said sampling means comprises plural sampling means, each being associated with a respective color component and each obtaining n samples of each of m line intervals of said respective color component; and said means for detecting the brightness level of each sampled picture element comprises plural means, each being associated with a respective color component and each detecting the brightness level of a sampled color picture element.

25. Apparatus for displaying a video picture in response to a received video signal which is formed of periodic vertical intervals, each vertical interval containing successive line intervals of video information, said apparatus comprising:

a matrix array of light emitting elements formed of m rows of electrodes and n columns of electrodes, the electrodes at the intersection of a row and a column being included in a light emitting element;

sampling means for obtaining n samples of each of m line intervals in a vertical interval;

storage means for storing n sampled picture elements in each line in an m×n matrix array of storage elements, said storage means including recirculating means for sequentially and repetitively recirculating on a row-by-row basis the picture elements stored in said first row to the m-th of storage elements, all of said picture elements being fully recirculated in a given period less than said vertical interval;

row driving means for sequentially and repetitively driving said m rows of electrodes in synchronism with the recirculating of said picture elements in said storage means;

reference voltage generating means for generating a reference voltage of staircase waveform during each vertical interval, the step interval of said staircase waveform being equal to said given period;

brightness detecting means supplied with said reference voltage and coupled to said first row of storage elements for detecting the brightness level of each picture element shifted into said first row of storage elements during each said given period; and column driving means responsive to said brightness detecting means for driving said columns of electrodes for energizing selected light emitting elements in a driven row for a duration that is a function of the brightness level of the respective sampled picture elements associated therewith, which duration is at least equal to said given period.

* * * * *